US011476671B2

(12) United States Patent
Wang et al.

(10) Patent No.: US 11,476,671 B2
(45) Date of Patent: Oct. 18, 2022

(54) WIND POWER CONVERTING DEVICE

(71) Applicant: Delta Electronics (Shanghai) Co., Ltd., Shanghai (CN)

(72) Inventors: Changyong Wang, Shanghai (CN); Yansong Lu, Shanghai (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 193 days.

(21) Appl. No.: 17/073,196

(22) Filed: Oct. 16, 2020

(65) Prior Publication Data

US 2021/0119449 A1 Apr. 22, 2021

(30) Foreign Application Priority Data

Oct. 22, 2019 (CN) .......................... 201911008419.0
Oct. 22, 2019 (CN) .......................... 201921782094.7

(51) Int. Cl.
| | | |
|---|---|---|
| *H02J 3/08* | (2006.01) | |
| *H02J 3/46* | (2006.01) | |
| *H02J 3/00* | (2006.01) | |
| *H02M 7/98* | (2006.01) | |
| *F03D 9/25* | (2016.01) | |

(52) U.S. Cl.
CPC ............... *H02J 3/08* (2013.01); *F03D 9/255* (2017.02); *H02J 3/004* (2020.01); *H02J 3/466* (2020.01); *H02M 7/98* (2013.01); *H02J 2300/28* (2020.01)

(58) Field of Classification Search
None
See application file for complete search history.

(56) References Cited

U.S. PATENT DOCUMENTS

| | | | |
|---|---|---|---|
| 2011/0049994 A1* | 3/2011 | Hiller | H02J 3/386 363/35 |
| 2012/0063179 A1 | 3/2012 | Gong et al. | |
| 2014/0307494 A1 | 10/2014 | Wu et al. | |
| 2015/0188443 A1 | 7/2015 | Takeda et al. | |
| 2017/0366096 A1* | 12/2017 | Wang | H02M 5/4585 |
| 2018/0123470 A1* | 5/2018 | Nielsen | H02P 27/04 |
| 2022/0158575 A1* | 5/2022 | Brogan | H02P 9/48 |

FOREIGN PATENT DOCUMENTS

| | | |
|---|---|---|
| CN | 103050991 A | 4/2013 |
| CN | 105990846 A | 10/2016 |
| CN | 109038639 A | 12/2018 |

* cited by examiner

*Primary Examiner* — Jared Fureman
*Assistant Examiner* — Joel Barnett
(74) *Attorney, Agent, or Firm* — Kirton McConkie; Evan R. Witt

(57) ABSTRACT

A wind power converting device includes a plurality of grid-side converters, a plurality of generator-side converters and a plurality of DC buses. The grid-side converters are connected with each other in series and electrically coupled to a power grid. The generator-side converters are connected with each other in series and electrically coupled to a generator device. The DC buses are electrically coupled between the grid-side converters and the generator-side converters. The DC buses include a positive DC bus, a negative DC bus and at least one intermediate DC bus between the positive DC bus and the negative DC bus. A cross section area of a conductor of the intermediate DC bus is smaller than 30% of a cross section area of a conductor of the positive DC bus or smaller than 30% of a cross section area of a conductor of the negative DC bus.

21 Claims, 12 Drawing Sheets

WIND POWER CONVERTING DEVICE

CROSS-REFERENCE TO RELATED APPLICATION

This application claims priority to China Patent Application No. 201911008419.0 filed on Oct. 22, 2019. This application also claims priority to China Patent Application No. 201921782094.7 filed on Oct. 22, 2019. The entire contents of the above-mentioned patent application are incorporated herein by reference for all purposes.

FIELD OF THE INVENTION

The present invention relates to a field of an electric power technology, and more particularly to wind power converting device.

BACKGROUND OF THE INVENTION

With the development of the renewable power, the technicians focus on the improvement of the wind power converting device, which is the core of the wind power generation system. In the field of the electricity-driven frequency converter and the converter for generating power, a plurality of converters are used according to the increasing system capacity. However, when a plurality of converters are used, a plurality of direct current (DC) buses extending for a long distance are used to transmit the voltage. If the cost about the energy transmission in the DC component cannot be lowered, the performance of the whole converter cannot be improved. Moreover, when the distance between the motor and the generator is longer (e.g., the distance between the converters in the motor side and the converters in the generator side is longer), a plurality of DC buses extending for a long distance are also used to transmit the voltage. If the cost about the energy transmission in the DC component cannot be lowered, the performance of the whole converter cannot be improved.

Generally, the wind power generator is designed to have long lifespan (e.g., 20 years). If the reliability of each converter in the wind power generator is not satisfied, the wind power generator may have a malfunction and needs to be shut down for maintenance. Consequently, the cost about the power generation increases. Moreover, if any of the plurality of converters in the wind power generator has the breakdown, the power generation of the wind power generator is insufficient. In other words, the stability of the conventional wind power generator is not satisfied.

Therefore, there is a need of providing an improved wind power converting device in order to overcome the drawbacks of the conventional technologies.

SUMMARY OF THE INVENTION

In accordance with an aspect of the present invention, a wind power converting device is provided. The wind power converting device includes one or a plurality of grid-side converters disposed in a lower part of a tower of a wind power generation system, one or a plurality of generator-side converters disposed in an upper part of the tower of the wind power generation system and a DC bus module. Each grid-side converter includes a plurality of grid-side output ports electrically coupled to a power grid, a first DC input port and a second DC input port. In every two adjacent grid-side converters of the plurality of grid-side converters, the second DC input port of one grid-side converter is connected with the first DC input port of the other grid-side converter in series. Each generator-side converter includes a plurality of generator-side input ports electrically coupled to a generator device, a first DC output port and a second DC output port. In every two adjacent generator-side converters of the plurality of generator-side converters, the second DC output port of one generator-side converter is connected with the first DC output port of the other generator-side converter in series. The DC bus module includes a plurality of DC buses electrically coupled between the plurality of grid-side converters and the plurality of generator-side converters. The plurality of DC buses include a positive DC bus, a negative DC bus and at least one intermediate DC bus between the positive DC bus and the negative DC bus. A cross section area of a conductor of the at least one intermediate DC bus is smaller than 30% of a cross section area of a conductor of the positive DC bus or smaller than 30% of a cross section area of a conductor of the negative DC bus.

In accordance with another aspect of the present invention, a wind power converting device is provided. The wind power converting device includes a plurality of grid-side converters, a plurality of generator-side converters, a DC bus module and at least one passive circuit protection component. The plurality of grid-side converters are disposed in a lower part of a tower of a wind power generation system, and each of the plurality of grid-side converters includes a plurality of grid-side output ports electrically coupled to a power grid, a first DC input port and a second DC input port. In every two adjacent grid-side converters of the plurality of grid-side converters, the second DC input port of one grid-side converter is connected with the first DC input port of the other grid-side converter in series. The plurality of generator-side converters are disposed in an upper part of the tower of the wind power generation system, and each of the plurality of generator-side converters includes a plurality of generator-side input ports electrically coupled to a generator device, a first DC output port and a second DC output port. In every two adjacent generator-side converters of the plurality of generator-side converters, the second DC output port of one generator-side converter is connected with the first DC output port of the other generator-side converter in series. The DC bus module includes a plurality of DC buses electrically coupled between the plurality of grid-side converters and the plurality of generator-side converters. The at least one passive circuit protection component is arranged in at least one power transmission path that is between the power grid and the generator device and established by the corresponding grid-side converter, the corresponding generator-side converter and the DC bus module. The electric energy is transferred through the power transmission path between the power grid and the generator device. If a current flowing through the power transmission path corresponding to the passive circuit protection component exceeds a threshold current value of the passive circuit protection component, the passive circuit protection component is in an open state.

In accordance with another aspect of the present invention, a wind power converting device is provided. The wind power converting device includes a plurality of grid-side converters, a plurality of generator-side converters, a DC bus module, at least one active circuit protection component and at least one detection circuit. The plurality of grid-side converters are disposed in a lower part of a tower of a wind power generation system, and each of the plurality of grid-side converters includes a plurality of grid-side output ports electrically coupled to a power grid, a first DC input port and a second DC input port. In every two adjacent grid-side converters of the plurality of grid-side converters, the second DC input port of one grid-side converter is connected with the first DC input port of the other grid-side converter in series. The plurality of generator-side converters are disposed in an upper part of the tower of the wind power generation system, and each of the plurality of generator-side converters includes a plurality of generator-side input ports electrically coupled to a generator device, a first DC output port and a second DC output port. In every two adjacent generator-side converters of the plurality of generator-side converters, the second DC output port of one generator-side converter is connected with the first DC output port of the other generator-side converter in series. The DC bus module includes a plurality of DC buses electrically coupled between the plurality of grid-side converters and the plurality of generator-side converters. The at least one active circuit protection component is arranged in at least one power transmission path that is between the power grid and the generator device and established by the corresponding grid-side converter, the corresponding generator-side converter and the DC bus module. The electric energy is transferred through the power transmission path between the power grid and the generator device. The at least one detection circuit is arranged in the corresponding power transmission path. If the detection circuit detects that the electric energy through the corresponding power transmission path is abnormal, the detection circuit issues an abnormal signal. In response to the abnormal signal, the active circuit protection component in the corresponding power transmission path is switched to an open state.

In accordance with another aspect of the present invention, a wind power converting device is provided. The wind power converting device includes a plurality of grid-side converters, a plurality of generator-side converters, a DC bus module and a plurality of generator-side control modules. The plurality of grid-side converters are disposed in a lower part of a tower of a wind power generation system, and each of the plurality of grid-side converters includes a plurality of grid-side output ports electrically coupled to a power grid, a first DC input port and a second DC input port. In every two adjacent grid-side converters of the plurality of grid-side converters, the second DC input port of one grid-side converter is connected with the first DC input port of the other grid-side converter in series. The plurality of generator-side converters are disposed in an upper part of the tower of the wind power generation system, and each of the plurality of generator-side converters includes a plurality of generator-side input ports electrically coupled to a generator device, a first DC output port and a second DC output port. In every two adjacent generator-side converters of the plurality of generator-side converters, the second DC output port of one generator-side converter is connected with the first DC output port of the other generator-side converter in series. The DC bus module includes a plurality of DC buses electrically coupled between the plurality of grid-side converters and the plurality of generator-side converters. The plurality of generator-side control modules are in communication with each other for controlling operations of the corresponding generator-side converters. If the generator-side converter corresponding to a specified generator-side control module of the plurality of generator-side control modules and/or the grid-side converter electrically coupled to the generator-side converter satisfies a predetermined protecting condition of the specified generator-side control module, the specified generator-side control module stops issuing a three-phase voltage control signal, so that the corresponding generator-side converter is disabled.

From the above descriptions, the wind power converting device includes a plurality of grid-side converters, a plurality of generator-side converters and a DC bus module. The DC sides of the plurality of grid-side converters are connected with each other in series through the first DC input ports and the second DC input ports. The DC sides of the plurality of generator-side converters are connected with each other in series through the first DC output ports and the second DC output ports. The DC bus module includes a plurality of DC buses. The plurality of DC buses include a positive DC bus, a negative DC bus and at least one intermediate DC bus between the positive DC bus and the negative DC bus. A cross section area of a conductor of the intermediate DC bus is smaller than 30% of a cross section area of a conductor of the positive DC bus or smaller than 30% of a cross section area of a conductor of the negative DC bus. In some embodiments, at least one of the plurality of DC buses includes a portion or the entire of a copper bus bar or a portion or the entire of an aluminum bus bar. In some embodiments, a plurality of generator-side control modules are in communication with each other for controlling operations of the corresponding generator-side converters, wherein if the generator-side converter corresponding to a specified generator-side control module of the plurality of generator-side control modules and/or the grid-side converter electrically coupled to the generator-side converter satisfies a predetermined protecting condition of the specified generator-side control module, the specified generator-side control module stops issuing a three-phase voltage control signal, so that the corresponding generator-side converter is disabled. In some embodiments, the wind power converting device further includes at least one passive circuit protection component. In some embodiments, the wind power converting device further includes at least one active circuit protection component and at least one detection circuit. Consequently, the above objects can be achieved.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
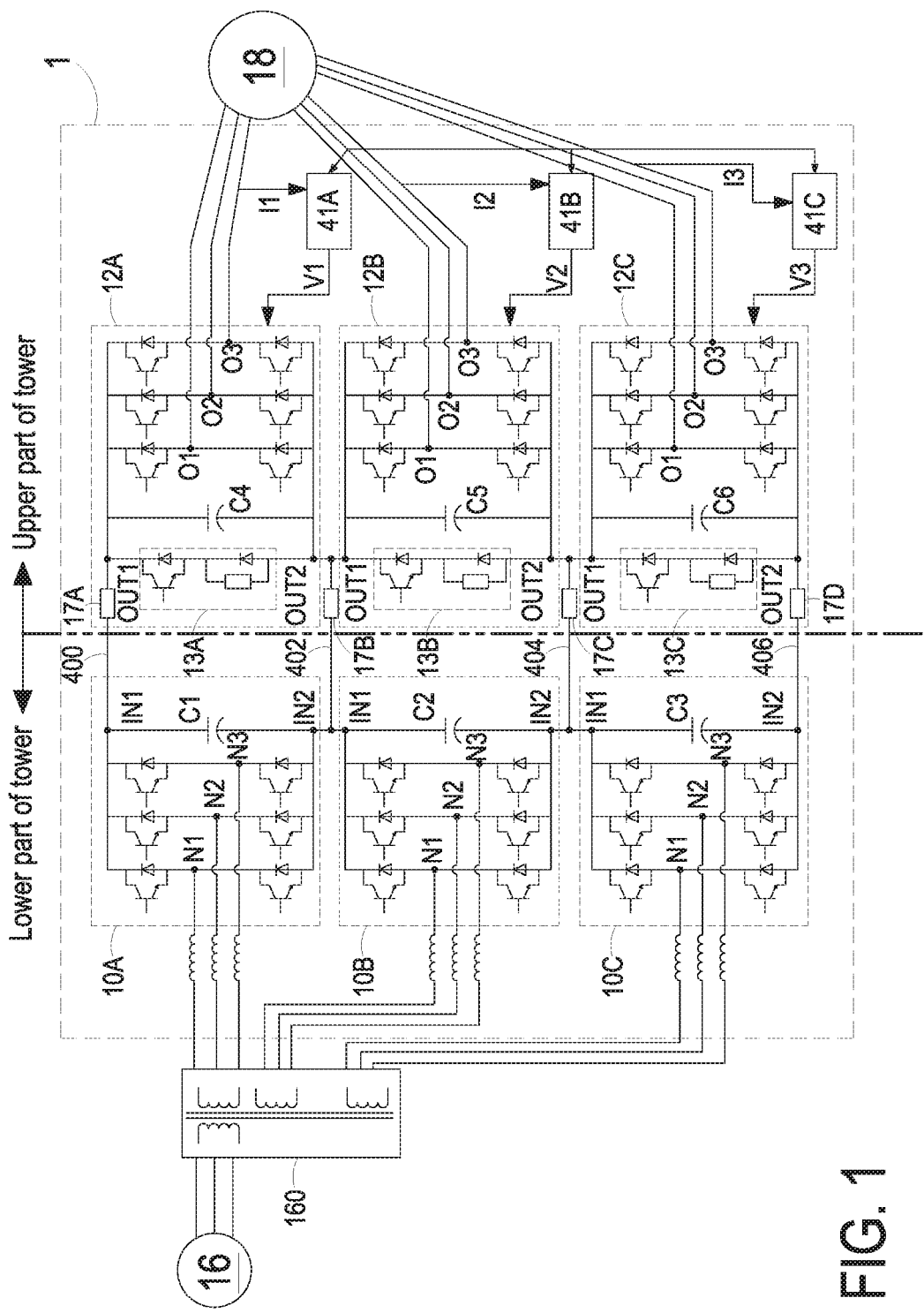
FIG. 1 is a circuit diagram of a wind power converting device according to a first embodiment of the present invention.

Please refer to FIG. 1. FIG. 1 is a circuit diagram of a wind power converting device according to a first embodiment of the present invention. The wind power converting device 1 includes a plurality of grid-side converters 10A~10C, a plurality of generator-side converters 12A~12C and a DC bus module. The grid-side converters 10A~10C and the generator-side converters 12A~12C are disposed in a lower part and an upper part of a tower of a wind power generation system, respectively. The generator-side converters 12A~12C are disposed in a room at the top of the tower of the wind power generation system. The grid-side converters 10A~10C are disposed in the bottom or the outside of the tower of the wind power generation system. Due to this design, the cost of the cables for transmitting power between the upper part and the lower part of the tower is reduced, and the weight loading on the upper part of the tower can be distributed equally as well.

In an embodiment, the plurality of grid-side converters are disposed in the lower part of the tower of the wind power generation system. Each of the plurality of grid-side converters includes a plurality of grid-side output ports, a first DC input port and a second DC input port. The plurality of grid-side output ports are electrically coupled to a power grid. In every two adjacent grid-side converters of the plurality of grid-side converters, the second DC input port of one grid-side converter is connected with the first DC input port of the other grid-side converter in series. The plurality of generator-side converters are disposed in the upper part of the tower of the wind power generation system. Each of the plurality of generator-side converters includes a plurality of generator-side input ports, a first DC output port and a second DC output port. The plurality of generator-side input ports are electrically coupled to a generator device. In every two adjacent generator-side converters of the plurality of generator-side converters, the second DC output port of one generator-side converter is connected with the first DC output port of the other generator-side converter in series. The DC bus module includes a plurality of DC buses. The plurality of DC buses are electrically coupled between the plurality of grid-side converters and the plurality of generator-side converters. Moreover, at least one of the plurality of DC buses includes a portion or the entire of a copper bus bar or a portion or the entire of an aluminum bus bar.

In an embodiment, the plurality of grid-side converters include n grid-side converters, the plurality of generator-side converters include n generator-side converters, and n is an integer greater than or equal to 2. The plurality of DC buses include a positive DC bus, a negative DC bus and at least one intermediate DC bus between the positive DC bus and the negative DC bus. The positive DC bus is electrically coupled between the first DC input port of a first grid-side converter of the n grid-side converters and the first DC output port of a first generator-side converter of the n generator-side converters. The negative DC bus is electrically coupled between the second DC input port of an n-th grid-side converter of the n grid-side converters and the second DC output port of an n-th generator-side converter of the n generator-side converters. The intermediate DC bus is electrically coupled between the second DC input port of an (n−1)-th grid-side converter of the n grid-side converters and the second DC output port of an (n−1)-th generator-side converter of the n generator-side converters.

In an embodiment, the components in the grid-side converters 10A~10C are identical. Take the grid-side converter 10A for example. The grid-side converter 10A is a two-level converter. Moreover, the grid-side converter 10A includes a plurality of grid-side output ports N1~N3 (e.g., three grid-side output ports), a first DC input port IN1 and a second DC input port IN2. The grid-side output ports N1~N3 are electrically coupled to a power grid 16. For example, the grid-side output ports N1~N3 are electrically coupled to the power grid 16 through a voltage transformer 160.

In the grid-side converters 10A~10C, the second DC input port IN2 of one grid-side converter is connected with the first DC input port IN1 of the adjacent grid-side converter in series. For example, the second DC input port IN2 of the grid-side converter 10A is connected with the first DC input port IN1 of the grid-side converter 10B in series, and the second DC input port IN2 of the grid-side converter 10B is connected with the first DC input port IN1 of the grid-side converter 10C in series.

In an embodiment, the number of the generator-side converters 12A~12C is the same as the number of the grid-side converters 10A~10C. Moreover, the components in the generator-side converters 12A~12C may be identical. For example, the generator-side converter 12A is a two-level converter. Moreover, the generator-side converter 12A includes a plurality of generator-side input ports O1~O3 (e.g. three generator-side input ports), a first DC output port OUT1 and a second DC output port OUT2. The generator-side input ports O1~O3 are electrically coupled to a generator device 18. In an embodiment, the generator device 18 is a permanent magnet synchronous generator device, an excitation synchronous generator device or an induction generator. The generator device 18 includes a plurality of winding groups. Each winding group corresponds to one generator-side converter. In an embodiment, the winding group includes three windings (not shown). The three windings of each winding group are electrically coupled to the generator-side input ports O1~O3 of the corresponding generator-side converter, respectively. For example, the three windings of each winding group in the generator device 18 are electrically coupled with the generator-side input ports O1~O3 of the generator-side converter 12A, respectively. In an embodiment, the generator-side converters 12A~12C are electrically coupled to the generator device 18 through a filtering circuit (not shown). For example, the filtering circuit includes inductors or/and capacitors.

In the generator-side converters 12A~12C, the second DC output port OUT2 of one generator-side converter is connected with the first DC output port OUT1 of the adjacent generator-side converter in series. For example, the second DC output port OUT2 of the generator-side converter 12A is connected with the first DC output port OUT1 of the generator-side converter 12B in series, and the second DC output port OUT2 of the generator-side converter 12B is connected with the first DC output port OUT1 of the generator-side converter 12C in series.

The DC bus module includes a plurality of DC buses 400, 402, 404 and 406. The DC bus 400 is electrically coupled to the first DC input port IN1 of the grid-side converter 10A and the first DC output port OUT1 of the generator-side converter 12A. The DC bus 400 is a positive DC bus for transferring the positive DC power. The DC bus 402 is electrically coupled to the second DC input port IN2 of the grid-side converter 10A and the second DC output port OUT2 of the generator-side converter 12A. That is, the DC bus 402 is also electrically coupled to the first DC input port IN1 of the grid-side converter 10B and the first DC output port OUT1 of the generator-side converter 12B. The DC bus 404 is electrically coupled to the second DC input port IN2 of the grid-side converter 10B and the second DC output port OUT2 of the generator-side converter 12B. That is, the DC bus 404 is also electrically coupled to the first DC input port IN1 of the grid-side converter 10C and the first DC output port OUT1 of the generator-side converter 12C. The DC buses 402 and 404 are intermediate DC buses. The DC bus 406 is electrically coupled to the second DC input port IN2 of the grid-side converter 10C and the second DC output port OUT2 of the generator-side converter 12C. The DC bus 406 is a negative DC bus for transferring the negative DC power. In an embodiment, the cross section area of a conductor of the intermediate DC bus is smaller than 30% of the cross section area of a conductor of the positive DC bus, or the cross section area of the conductor of the intermediate DC bus is smaller than 30% of the cross section area of a conductor of the negative DC bus.

In an embodiment, the DC bus module further includes a plurality of bus capacitors C1~C6. The bus capacitors C1~C6 are electrically connected between the first DC input ports IN1 and the second DC input ports IN2 of the corresponding grid-side converters 10A~10C and the first DC output port OUT1 and the second DC output port OUT2 of the corresponding generator-side converters 12A~12C in parallel. The bus capacitors C1~C6 are used for supporting the voltages of these input ports and these output ports. Each of the bus capacitors C1~C6 includes a capacitor or a plurality of serially-connected capacitors.

In an embodiment, the wind power converting device 1 further includes a plurality of chopper circuits 13A, 13B and 13C. The chopper circuits 13A, 13B and 13C are respectively connected between the first DC output ports OUT1 and the second DC output ports OUT2 of the corresponding generator-side converters 12A~12C in parallel. The chopper circuits 13A, 13B and 13C perform the voltage-balancing protection on the generator-side converters 12A~12C, respectively. For example, the chopper circuit 13A includes a controllable power semiconductor switch, a resistor, a first diode and a second diode. The collector of the controllable power semiconductor switch is electrically connected with the cathode of the first diode and the first DC output port OUT1 of the generator-side converter 12A. The emitter of the controllable power semiconductor switch is electrically connected with the anode of the first diode. A first terminal of the resistor is electrically connected with the emitter of the controllable power semiconductor switch. A second terminal of the resistor is electrically connected with the second DC output port OUT2 of the generator-side converter 12A. That is, the resistor and the second diode are connected with each other in parallel. In some embodiments, the wind power converting device 1 further includes a plurality of chopper circuits, which are respectively connected between the first DC input ports and the second DC input ports of the corresponding grid-side converters in parallel and respectively connected between the first DC output port and the second DC output port of the corresponding generator-side converters in parallel. The chopper circuits perform the voltage-balancing protection on the grid-side converters and the generator-side converters, respectively.

As mentioned above, the second DC input port IN2 of one grid-side converter is connected with the first DC input port IN1 of the adjacent grid-side converter in series. Consequently, the grid-side converters 10A~10C are electrically connected with each other in series. Moreover, the second DC output port OUT2 of one generator-side converter is connected with the first DC output port OUT1 of the adjacent generator-side converter in series. Consequently, the generator-side converters 12A~12C are electrically connected with each other in series.

Since the grid-side converters are electrically connected with each other in series and the generator-side converters are electrically connected with each other in series, the magnitude of the DC voltage between the positive DC bus and the negative DC bus can be adjusted according to the numbers of the serially-connected grid-side converters and the serially-connected generator-side converters. In such way, the design of the wind power converting device 1 can be more flexible. As mentioned above, the cross section area of a conductor of the intermediate DC bus is smaller than 30% of the cross section area of a conductor of the positive DC bus, or the cross section area of the conductor of the intermediate DC bus is smaller than 30% of the cross section area of a conductor of the negative DC bus. Preferably, the cross section area of the conductor of the positive DC bus and the cross section area of the conductor of the negative DC bus are equal. Consequently, the cost of the DC buses between the grid-side converters 10A~10C and the generator-side converters 12A~12C can be reduced.

In some embodiments, at least one of the DC buses 400, 402, 404 and 406 between the generator-side converters 12A~12C at the upper part of the tower and the grid-side converters 10A~10C at the lower part of the tower includes a portion or the entire of a copper bus bar or a portion or the entire of an aluminum bus bar. For example, the DC bus 400 includes a copper bus bar or an aluminum bus bar, and the other DC buses 402, 404 and 406 are cables. Alternatively, each of the DC buses 400, 402, 404 and 406 includes a copper bus bar or an aluminum bus bar. Consequently, the cost of the DC bus is reduced.

The control mechanism of the generator-side converters 12A~12C will be illustrated in more details as follows.

The wind power converting device 1 further includes a plurality of generator-side control modules corresponding to the respective generator-side converters. The generator-side control module receives a three-phase input current amount and a second-axis general given current component from the plurality of generator-side input ports of the corresponding generator-side converter. According to the three-phase input current amount and the second-axis general given current component, the generator-side control module generates a three-phase voltage control signal to control the operations of the corresponding generator-side converter.

In this embodiment, the wind power converting device 1 further includes a plurality of generator-side control modules 41A~41C. The generator-side control module 41A is used for controlling the generator-side converter 12A. The generator-side control module 41B is used for controlling the generator-side converter 12B. The generator-side control module 41C is used for controlling the generator-side converter 12C. According to the three-phase input current amounts I1~I3 corresponding to the generator-side input ports O1~O3 of the corresponding generator-side converters 12A~12C and the second-axis general given current component $i_{q\_norm*}$, the generator-side control modules 41A~41C generate the corresponding three-phase voltage control signals V1~V3 to control the operations of the corresponding generator-side converters 12A~12C.

In some embodiments, the generator-side control modules include a primary generator-side control module and at least one secondary generator-side control module. Preferably but not exclusively, the circuitry topologies of the generator-side control modules 41A~41C are identical. Moreover, one of the generator-side control modules is the primary generator-side control module, and the other generator-side control modules are the secondary generator-side control modules. In the following examples, the generator-side control module 41A is the primary generator-side control module.

Figure 7:
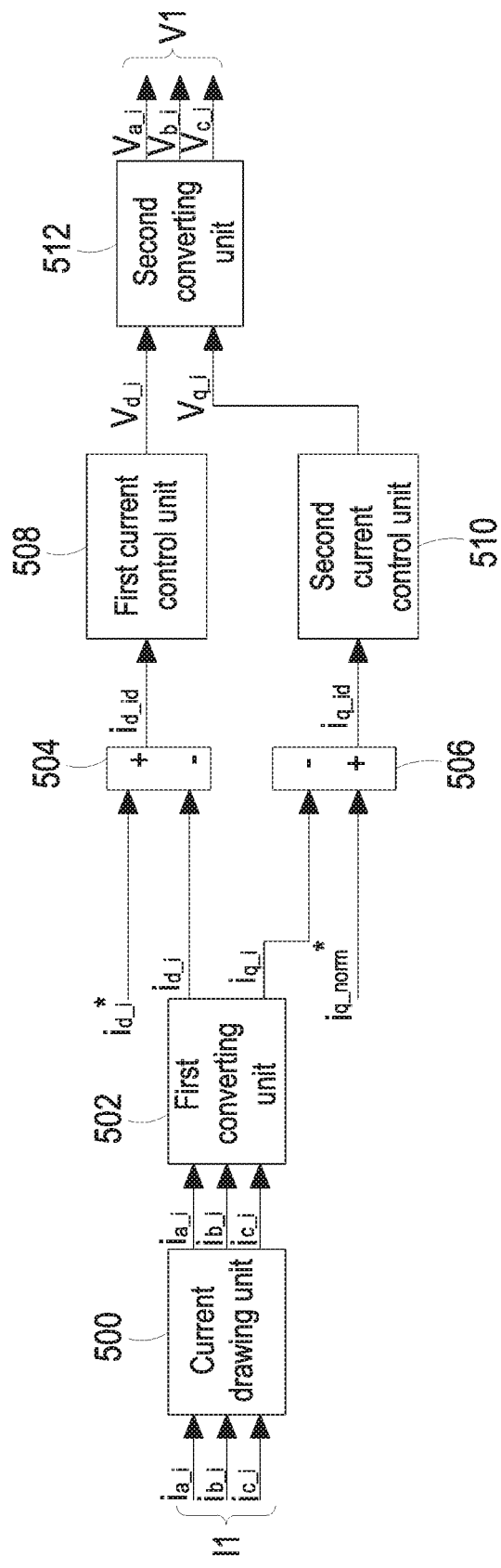
FIG. 7 is a schematic block diagram illustrating the circuitry topology of the generator-side control module of the wind power converting device according to the first embodiment of the present invention.

Please refer to FIG. 7. FIG. 7 is a schematic block diagram illustrating the circuitry topology of the generator-side control module of the wind power converting device according to the first embodiment of the present invention. The generator-side control module 41A includes a current drawing unit 500, a first converting unit 502, a first computing unit 504, a second computing unit 506, a first current control unit 508, a second current control unit 510 and a second converting unit 512.

The current drawing unit 500 is electrically coupled to the generator-side input ports O1~O3 of the generator-side converter 12A to draw the three-phase input current amount I1. In an embodiment, the three-phase input current amount I1 includes three components $i_{a\_i}$, $i_{b\_i}$ and $i_{c\_i}$.

The first converting unit 502 is configured to convert the three components $i_{a\_i}$, $i_{b\_i}$, $i_{c\_i}$ and of the three-phase input current amount I1 into a first-axis current component $i_{d\_i}$ and a second-axis current component $i_{q\_i}$. In an embodiment, the first converting unit 502 includes a dq rotation coordinate that includes a d axis and a q axis. The first-axis current component $i_{d\_i}$ corresponds to the d axis of the dq rotation coordinate and the second-axis current component $i_{q\_i}$ corresponds to the q axis of the dq rotation coordinate. In an embodiment, the first-axis current component $i_{d\_i}$ is a reactive current component and the second-axis current component $i_{q\_i}$ is an active current component. Alternatively, in another embodiment, the first-axis current component $i_{d\_i}$ is an active current component and the second-axis current component $i_{q\_i}$ is a reactive current component.

The first computing unit 504 performs computation to generate a first-axis difference $i_{d\_id}$ according to the first-axis current component $i_{d\_i}$ and a first-axis independent given current component $i_{d\_i*}$.

The second computing unit 506 performs computation to generate a second-axis difference $i_{q\_id}$ according to the second-axis current component $i_{q\_i}$ and the second-axis general given current component $i_{q\_norm*}$. In this embodiment, the second-axis general given current component $i_{q\_norm*}$ is generated by the generator-side control module 41A, and the second-axis general given current component $i_{q\_norm*}$ is transmitted from the generator-side control module 41A to the generator-side control modules 41B and 41C. In another embodiment, the second-axis general given current component $i_{q\_norm*}$ is provided from an external control module (not shown) to the generator-side control module 41A, and the second-axis general given current component $i_{q\_norm*}$ is transmitted from the generator-side control module 41A to the generator-side control modules 41B and 41C. In this embodiment, the generator side control module 41A is in communication with the generator-side control modules 41B and 41C. In some other embodiments, the second-axis general given current component $i_{q\_norm*}$ can be received by the generator side-control module 41B or 41C from the external control module and transmitted to other-generator side control modules.

The first current control unit 508 is configured to generate a first-axis voltage control signal $V_{d\_i}$ according to the first-axis difference $i_{d\_id}$. The second current control unit 510 is configured to generate a second-axis voltage control signal $V_{q\_i}$ according to the second-axis difference $i_{q\_id}$. The second converting unit 512 is configured to convert the first-axis voltage control signal $V_{d\_i}$ and the second-axis voltage control signal $V_{q\_i}$ into the three-phase voltage control signal V1. In an embodiment, the three-phase voltage control signal V1 includes three components $V_{a\_i}$, $V_{b\_i}$ and $V_{c\_i}$.

The on/off states of the power semiconductor switches in the generator-side converter 12A are controlled according to the three-phase voltage control signal V1. Consequently, the generator-side converter 12A is operated in a rectifying state, an inverting state or a disabling state.

The generator-side converters 12A~12C are controlled by the generator-side control modules 41A~41C according to the above control method. Consequently, the wind power converting device 1 can be operated normally.

In an embodiment, the generator-side control module 41A, the generator-side control module 41B and the generator-side control module 41C are in communication with each other. Moreover, each of the generator-side control module 41A, the generator-side control module 41B and the generator-side control module 41C has a predetermined protecting condition. For example, if the DC fault in the coupling path between the grid-side converter 10A and the power grid 16 is detected, the DC fault in the DC bus 400 and the DC bus 402 is detected or the DC fault in the coupling path between the generator-side converter 12A and the generator device 18 is detected, the protecting condition of the generator-side converter 12A corresponding to the generator-side control module 41A is satisfied and/or the protecting condition of the grid-side converter 10A electrically coupled to the generator-side converter 12A is satisfied. Under this circumstance, the generator-side control module 41A stops issuing the three-phase voltage control signal V1. Consequently, the generator-side converter 12A is disabled. Similarly, if the protecting condition of the generator-side converter 12B corresponding to the generator-side control module 41B is satisfied and/or the protecting condition of the grid-side converter 10B electrically coupled to the generator-side converter 12B is satisfied, the generator-side control module 41B stops issuing the three-phase voltage control signal V2. Consequently, the generator-side converter 12B is disabled. Similarly, if the protecting condition of the generator-side converter 12C corresponding to the generator-side control module 41C is satisfied and/or the protecting condition of the grid-side converter 10C electrically coupled to the generator-side converter 12C is satisfied, the generator-side control module 41C stops issuing the three-phase voltage control signal V3. Consequently, the generator-side converter 12C is disabled.

As mentioned above, the generator-side control module 41A, the generator-side control module 41B and the generator-side control module 41C are in communication with each other. If any generator-side control module is disabled, the other enabled generator-side converters are controlled by the corresponding generator-side control modules to support the required operations of the disabled generator-side converter. Consequently, the wind power converting device 1 has a redundant operation function. If any converter has a malfunction, the other normal converters can support the required operations of the malfunctioned generator-side converter. Consequently, the stability and the reliability of the wind power converting device 1 are increased. In some other embodiments, the predetermined protecting condition is satisfied when an over-current event and/or an over-voltage event occurs.

For increasing the reliability of the wind power converting device 1, the wind power converting device 1 further includes at least one passive circuit protection component. The at least one passive circuit protection component is arranged in at least one power transmission path that is between the power grid 16 and the generator device 18 and established by the corresponding grid-side converter, the corresponding generator-side converter and the DC bus module. The electric energy can be transferred through the power transmission path between the power grid 16 and the generator device 18. The passive circuit protection component has a threshold current value. If the current flowing through the power transmission path exceeds the threshold current value of the passive circuit protection component, the passive circuit protection component is in an open state. Since the components of the grid-side converter and the corresponding generator-side converter in the power transmission path are protected from the over-current problem, the reliability of the wind power converting device is enhanced. For example, the passive circuit protection component is a fuse. Some examples of the installation positions of the passive circuit protection components will be described in FIGS. 1, 2 and 3.

Please refer to FIG. 1 again. In this embodiment, the wind power converting device 1 includes at least one passive circuit protection component, for example four passive circuit protection components 17A, 17B, 17C and 17D. The passive circuit protection component 17A is electrically connected with the DC bus 400 and electrically connected between the first DC input port IN1 of the grid-side converter 10A and the first DC output port OUT1 of the generator-side converter 12A. The passive circuit protection component 17B is electrically connected with the DC bus 402 and electrically connected between the second DC input port IN2 of the grid-side converter 10A and the second DC output port OUT2 of the generator-side converter 12A. The passive circuit protection component 17C is electrically connected with the DC bus 404 and electrically connected between the second DC input port IN2 of the grid-side converter 10B and the second DC output port OUT2 of the generator-side converter 12B. The passive circuit protection component 17D is electrically connected with the DC bus 406 and electrically connected between the second DC input port IN2 of the grid-side converter 10C and the second DC output port OUT2 of the generator-side converter 12C.

Figure 2:
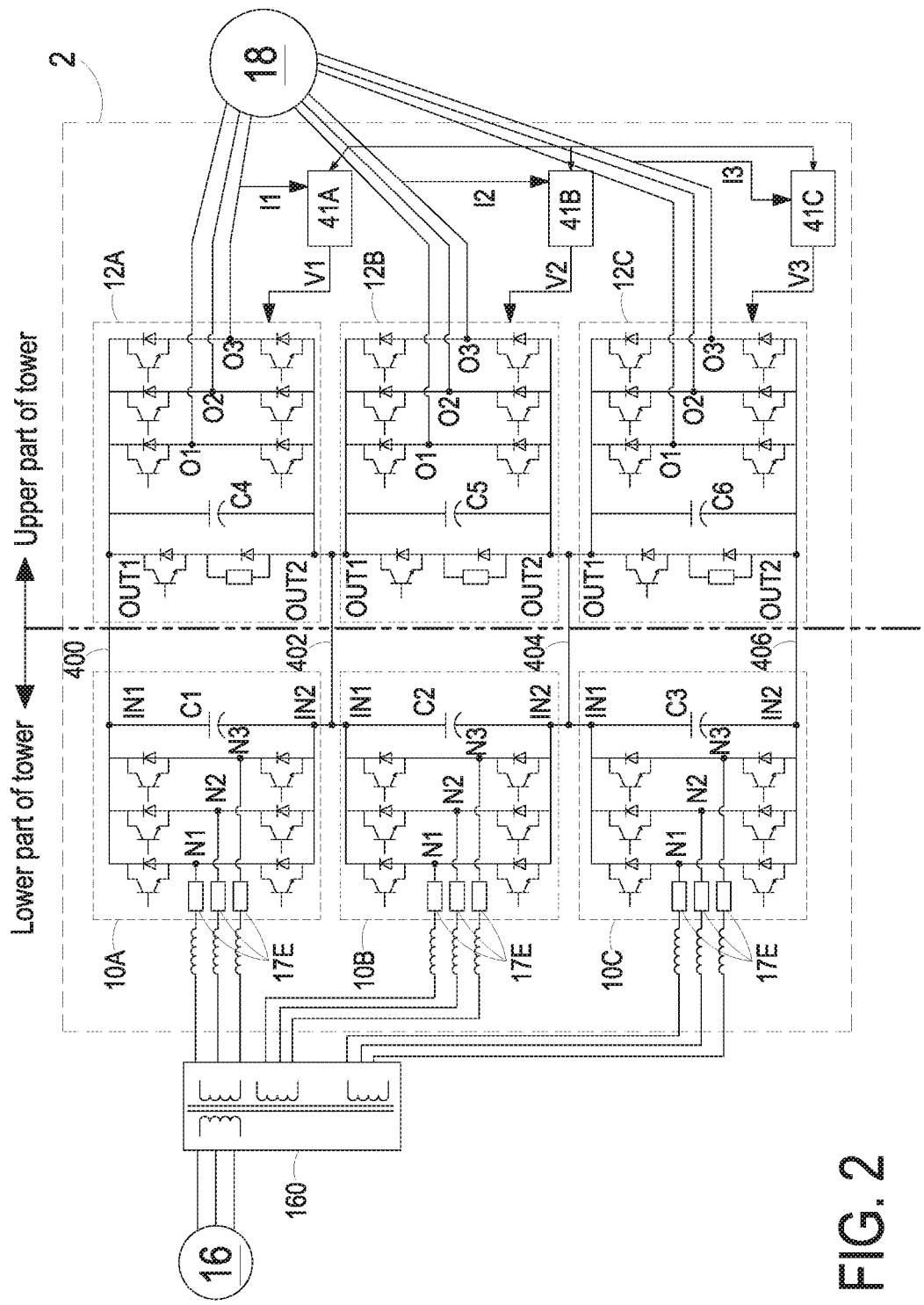
FIG. 2 is a circuit diagram of a wind power converting device according to a second embodiment of the present invention.

FIG. 2 is a circuit diagram of a wind power converting device according to a second embodiment of the present invention. As for the second embodiment, the elements and features indicated by the numerals similar to those of the first embodiment of FIG. 1 mean similar elements and features, and are not redundantly described herein. In this embodiment, the wind power converting device 2 includes at least one passive circuit protection component, for example a plurality of passive circuit protection components 17E. Each passive circuit protection component 17E is electrically connected with the connection line between the grid-side output port of the corresponding grid-side converter and the power grid 16. In an embodiment, nine passive circuit protection components 17E are respectively electrically connected with the connection lines between the grid-side output ports N1~N3 of the grid-side converters 10A~10C and the power grid 16. It is noted that numerous modifications and alterations may be made while retaining the teachings of the invention. In another embodiment, the passive circuit protection components 17E are electrically connected with the connection lines between one or two of the grid-side output ports N1~N3 of the grid-side converters 10A~10C and the power grid 16.

Figure 3:
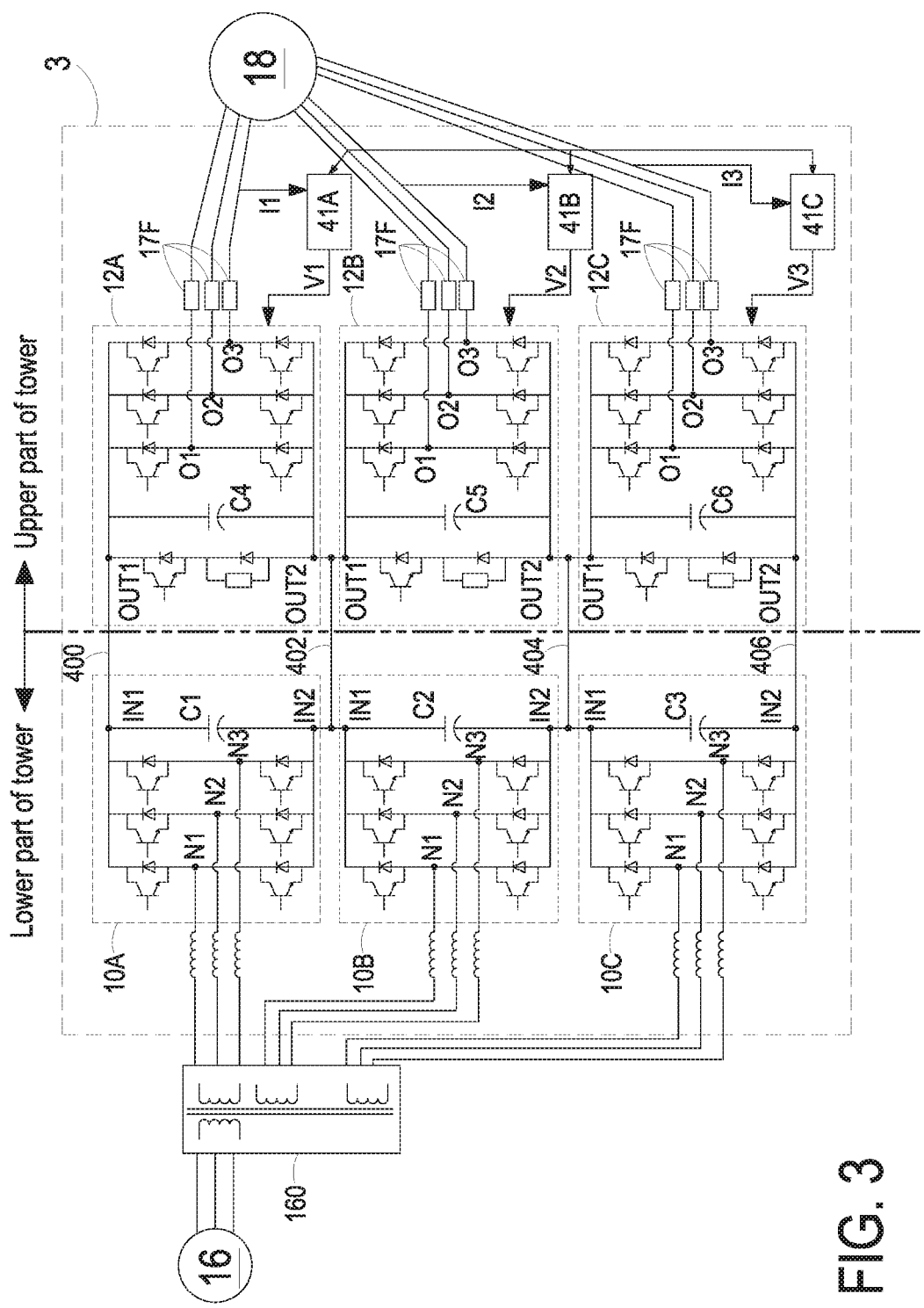
FIG. 3 is a circuit diagram of a wind power converting device according to a third embodiment of the present invention.

FIG. 3 is a circuit diagram of a wind power converting device according to a third embodiment of the present invention. As for the third embodiment, the elements and features indicated by the numerals similar to those of the first embodiment of FIG. 1 mean similar elements and features, and are not redundantly described herein. In this embodiment, the wind power converting device 3 includes at least one passive circuit protection component, for example a plurality of passive circuit protection components 17F. Each passive circuit protection component 17F is electrically connected with the connection line between the generator-side input port of the corresponding grid-side converter and the generator device 18. In an embodiment, nine passive circuit protection components 17F are respectively electrically connected with the connection lines between the generator-side input ports O1~O3 of the corresponding generator-side converters 12A~12C and the generator device 18. It is noted that numerous modifications and alterations may be made while retaining the teachings of the invention. In another embodiment, the passive circuit protection components 17F are electrically connected with the connection lines between one or two of the generator-side input ports O1~O3 of the corresponding generator-side converters 12A~12C and the generator device 18.

In an embodiment, predetermined protecting condition of the generator-side control module 41A, the generator-side control module 41B or the generator-side control module 41C is satisfied when the corresponding passive circuit protection component is in the open state.

In some embodiments, the passive circuit protection components employed in the wind power converting device as shown in FIGS. 1, 2 and 3 are replaced by active circuit protection components (e.g., relays or switches). Moreover, the wind power converting device further includes at least one detection circuit corresponding to the at least one active circuit protection component. In an embodiment, the number of the detection circuits is equal to the number of the active circuit protection components. Each active circuit protection component and the corresponding detection circuit are arranged in the power transmission path between the power grid and the generator device that is established by the corresponding grid-side converter, the corresponding generator-side converter and the DC bus module. Each detection circuit is used for detecting whether the electric energy transferred through the corresponding power transmission path is abnormal (e.g., DC fault). If the detection circuit detects the abnormal event occurs, the detection circuit issues an abnormal signal. In response to the abnormal signal, the corresponding active circuit protection component is switched to the open state. For example, the detection circuit is a current sensor. Some examples of the installation positions of the detection circuits will be described in FIGS. 4, 5 and 6. The installation positions of the active circuit protection components are similar to the installation positions of the passive circuit protection components as shown in FIGS. 1, 2 and 3.

Each detection circuit is used for detecting whether the electric energy transferred through the corresponding power transmission path is abnormal. As mentioned above, the installation positions of the active circuit protection components are similar to the installation positions of the passive circuit protection components as shown in FIGS. 1, 2 and 3. For succinctness, the installation positions of the active circuit protection components in the wind power converting devices as shown in FIGS. 4, 5 and 6 have the arrangement as shown in FIG. 1.

Figure 4:
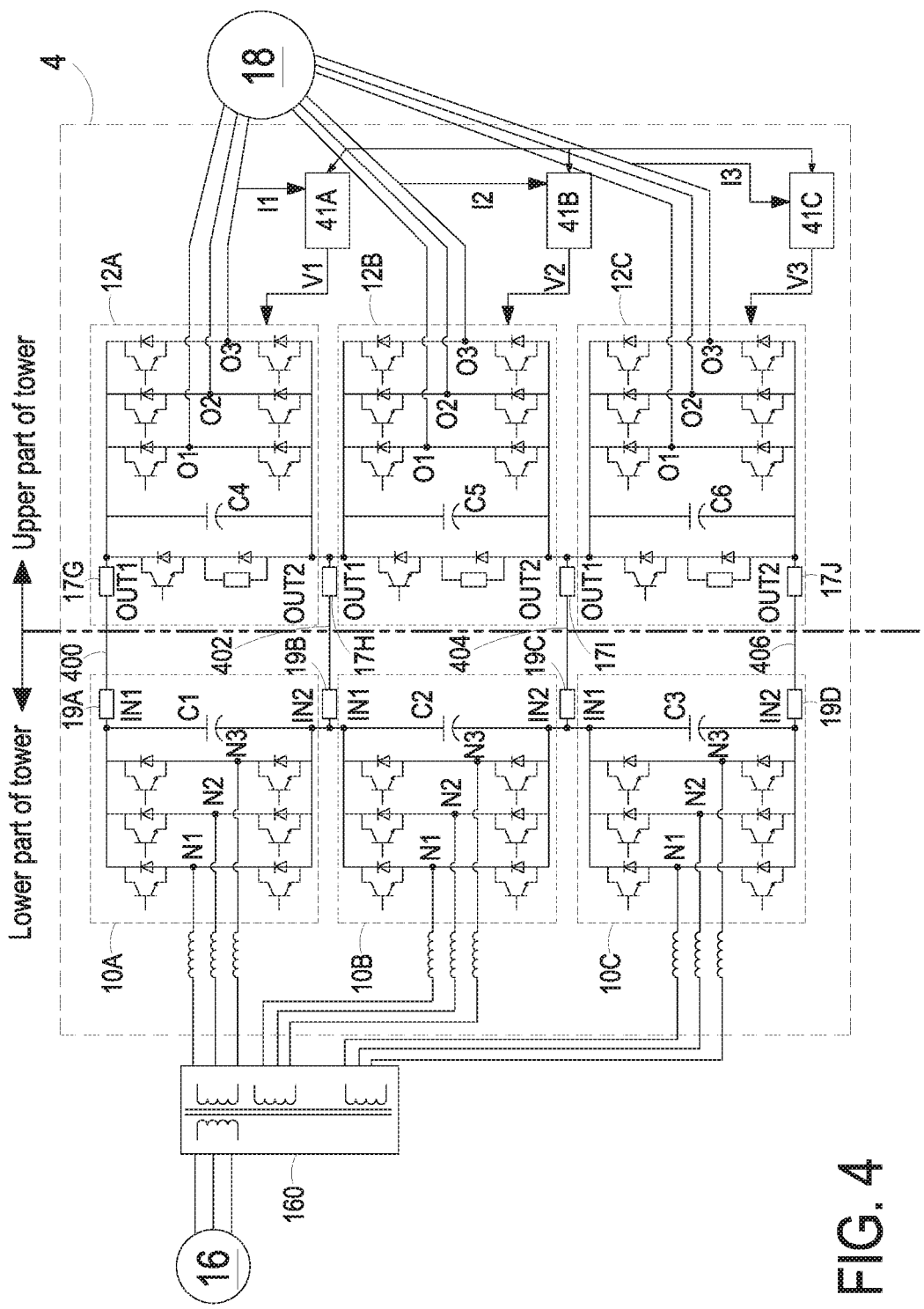
FIG. 4 is a circuit diagram of a wind power converting device according to a fourth embodiment of the present invention.

FIG. 4 is a circuit diagram of a wind power converting device according to a fourth embodiment of the present invention. The wind power converting device 4 includes at least one active circuit protection component and at least one detection circuit. As shown in FIG. 4, the wind power converting device 4 includes four active circuit protection components 17G, 17H, 17I, 17J and four detection circuits 19A, 19B, 19C, 19D. The active circuit protection component 17G is electrically connected with the DC bus 400 and electrically connected between the first DC input port IN1 of the grid-side converter 10A and the first DC output port OUT1 of the generator-side converter 12A. The active circuit protection component 17H is electrically connected with the DC bus 402 and electrically connected between the second DC input port IN2 of the grid-side converter 10A and the second DC output port OUT2 of the generator-side converter 12A (i.e., between the first DC input port IN1 of the grid-side converter 10B and the first DC output port OUT1 of the generator-side converter 12B). The active circuit protection component 17I is electrically connected with the DC bus 404 and electrically connected between the second DC input port IN2 of the grid-side converter 10B and the second DC output port OUT2 of the generator-side converter 12B (i.e., between the first DC input port IN1 of the grid-side converter 10C and the first DC output port OUT1 of the generator-side converter 12C). The active circuit protection component 17J is electrically connected with the DC bus 406 and electrically connected between the second DC input port IN2 of the grid-side converter 10C and the second DC output port OUT2 of the generator-side converter 12C. The detection circuit 19A is electrically connected with the DC bus 400 for detecting whether the electric energy transferred through the power transmission path of the DC bus 400 is abnormal. If the detection circuit 19A detects the abnormal event occurs, the detection circuit 19A issues an abnormal signal. In response to the abnormal signal from the detection circuit 19A, the active circuit protection component 17G is switched to the open state. The detection circuit 19B is electrically connected with the DC bus 402 for detecting whether the electric energy transferred through the power transmission path of the DC bus 402 is abnormal. If the detection circuit 19B detects the abnormal event occurs, the detection circuit 19B issues an abnormal signal. In response to the abnormal signal from the detection circuit 19B, the active circuit protection component 17H is switched to the open state. The detection circuit 19C is electrically connected with the DC bus 404 for detecting whether the electric energy transferred through the power transmission path of the DC bus 404 is abnormal. If the detection circuit 19C detects the abnormal event occurs, the detection circuit 19C issues an abnormal signal. In response to the abnormal signal from the detection circuit 19C, the active circuit protection component 17I is switched to the open state. The detection circuit 19D is electrically connected with the DC bus 406 for detecting whether the electric energy transferred through the power transmission path of the DC bus 406 is abnormal. If the detection circuit 19D detects the abnormal event occurs, the detection circuit 19D issues an abnormal signal. In response to the abnormal signal from the detection circuit 19D, the active circuit protection component 17J is switched to the open state.

It is noted that numerous modifications and alterations may be made while retaining the teachings of the invention. For example, in some other embodiments, the number of the at least one detection circuit is not equal to the number of the at least one active circuit protection component. For example, one detection circuit is electrically connected with a plurality of active circuit protection components. The detection circuit is arranged in the power transmission path between the power grid and the generator device that is established by the corresponding grid-side converter, the corresponding generator-side converter and the DC bus module. The detection circuit is used for detecting whether the electric energy transferred through the corresponding power transmission path is abnormal. If the detection circuit detects the abnormal event occurs, the detection circuit issues an abnormal signal. In response to the abnormal signal, the corresponding active circuit protection component is switched to the open state.

Figure 5:
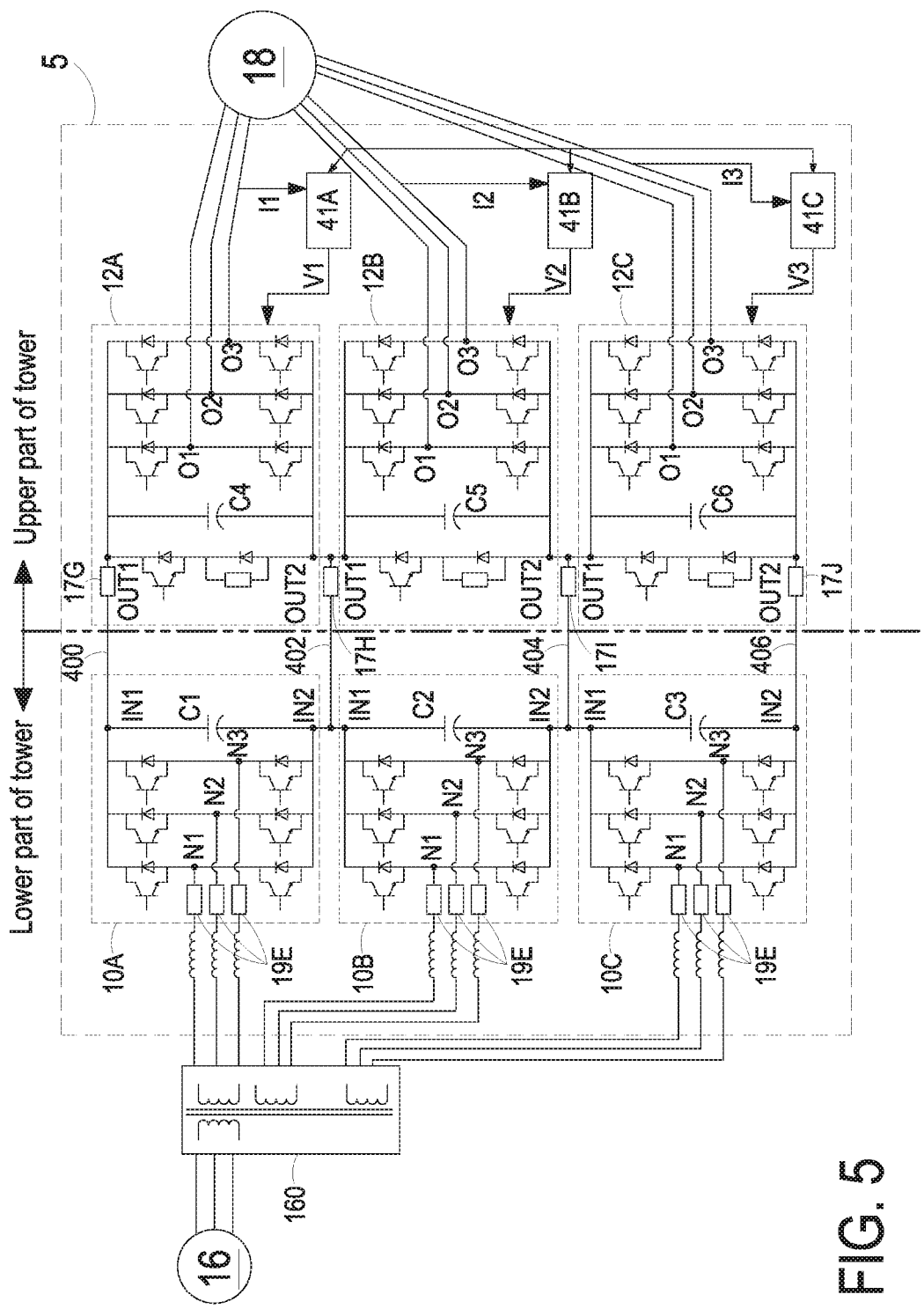
FIG. 5 is a circuit diagram of a wind power converting device according to a fifth embodiment of the present invention.
Figure 6:
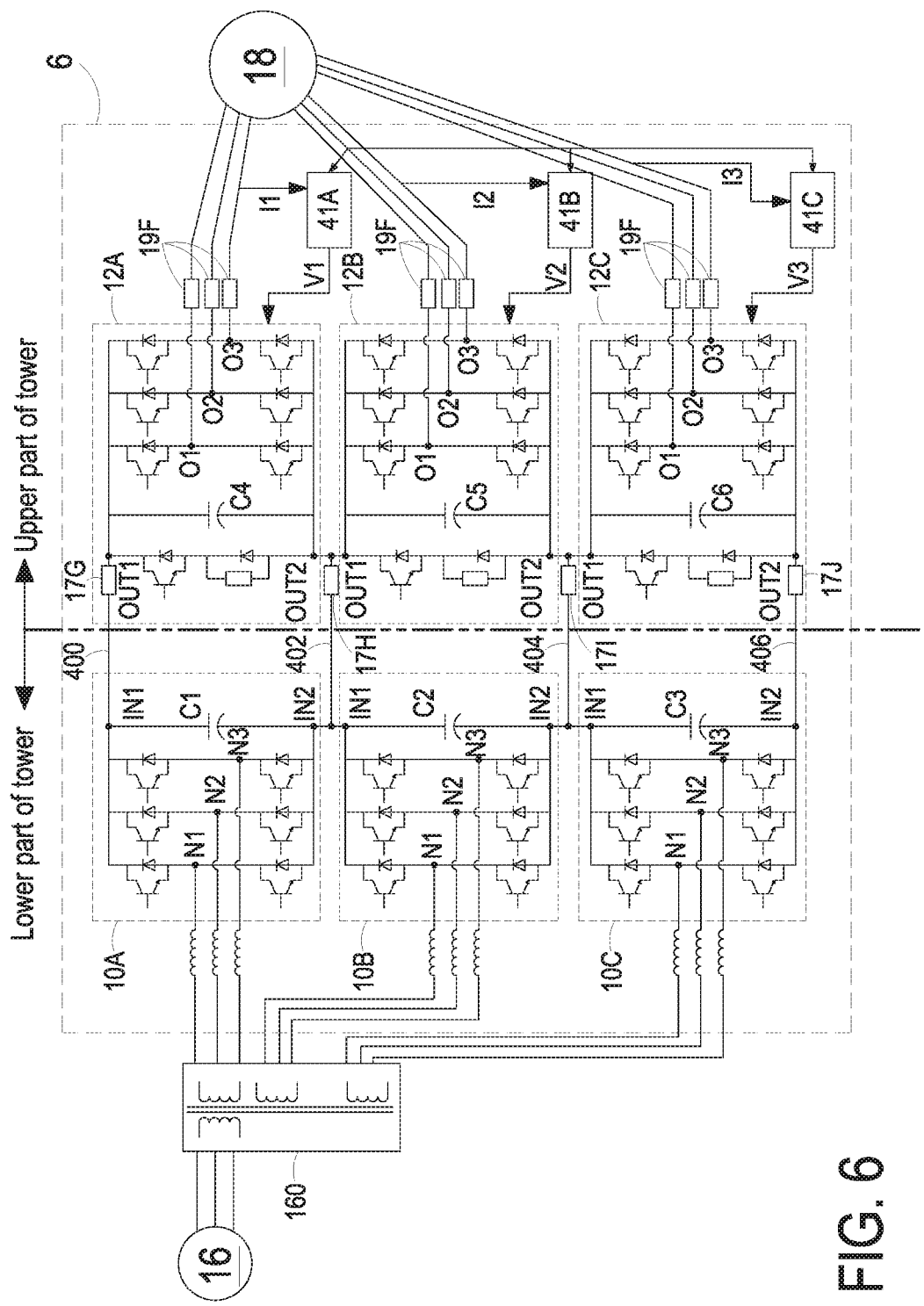
FIG. 6 is a circuit diagram of a wind power converting device according to a sixth embodiment of the present invention.

FIG. 5 is a circuit diagram of a wind power converting device according to a fifth embodiment of the present invention. As for the fifth embodiment, the elements and features indicated by the numerals similar to those of the fourth embodiment of FIG. 4 mean similar elements and features, and are not redundantly described herein. In this embodiment, the wind power converting device 5 includes at least one active circuit protection component and at least one detection circuit. As shown in FIG. 5, the wind power converting device 5 includes four active circuit protection components 17G, 17H, 17I, 17J and a plurality of detection circuits 19E. Each detection circuit 19E is electrically connected with the connection line between the grid-side output port of the corresponding grid-side converter and the power grid 16. In an embodiment, nine detection circuits 19E are respectively electrically connected with the connection lines between the grid-side output ports N1~N3 of the grid-side converters 10A~10C and the power grid 16. It is noted that numerous modifications and alterations may be made while retaining the teachings of the invention. In another embodiment, the detection circuits 19E are electrically connected with the connection lines between one or two of the grid-side output ports N1~N3 of the grid-side converters 10A~10C and the power grid 16. Each detection circuit 19E is used for detecting whether the electric energy transferred through the corresponding power transmission path is abnormal. If the detection circuit 19E detects the abnormal event occurs, the detection circuit issues an abnormal signal. In response to the abnormal signal, the corresponding active circuit protection component is switched to the open state.

FIG. 6 is a circuit diagram of a wind power converting device according to a sixth embodiment of the present invention. As for the sixth embodiment, the elements and features indicated by the numerals similar to those of the fourth embodiment of FIG. 4 mean similar elements and features, and are not redundantly described herein. In this embodiment, the wind power converting device 6 includes at least one active circuit protection component and at least one detection circuit. As shown in FIG. 6, the wind power converting device 6 includes four active circuit protection components 17G, 17H, 17I, 17J and a plurality of detection circuits 19F. Each detection circuit 19F is electrically connected with the connection line between the generator-side input port of the corresponding generator-side converter and the generator device 18. In an embodiment, nine detection circuits 19F are respectively electrically connected with the connection lines between the generator-side input ports O1~O3 of the corresponding generator-side converters 12A~12C and the generator device 18. It is noted that numerous modifications and alterations may be made while retaining the teachings of the invention. In another embodiment, the detection circuits 19F are electrically connected with the connection lines between one or two of the generator-side input ports O1~O3 of the corresponding generator-side converters 12A~12C and the generator device 18. Each detection circuit 19E is used for detecting whether the electric energy transferred through the corresponding power transmission path is abnormal. If the detection circuit 19F detects the abnormal event occurs, the detection circuit 19F issues an abnormal signal. In response to the abnormal signal, the corresponding active circuit protection component is switched to the open state.

In an embodiment, predetermined protecting condition of the generator-side control module 41A, the generator-side control module 41B or the generator-side control module 41C is satisfied when the abnormal signal from the corresponding detection circuit is received.

The number of the grid-side converters, the number of the generator-side converters, the circuitry topology of the grid-side converter and the circuitry topology of the generator-side converter may be varied. However, the above technical features are retained. For example, the cross section area of a conductor of the intermediate DC bus is smaller than 30% of the cross section area of a conductor of the positive DC bus, or the cross section area of the conductor of the intermediate DC bus conductor is smaller than 30% of the cross section area of the conductor of the negative DC bus, or at least one of the DC buses includes a portion or the entire of a copper bus bar or a portion or the entire of an aluminum bus bar. Moreover, the redundant operation function, the installation of the passive circuit protection components, the installation of the active circuit protection components and/or the installation of the detection circuits may be applied to the following embodiments. For succinctness, the above technical features are omitted and not redundantly described herein.

Figure 8:
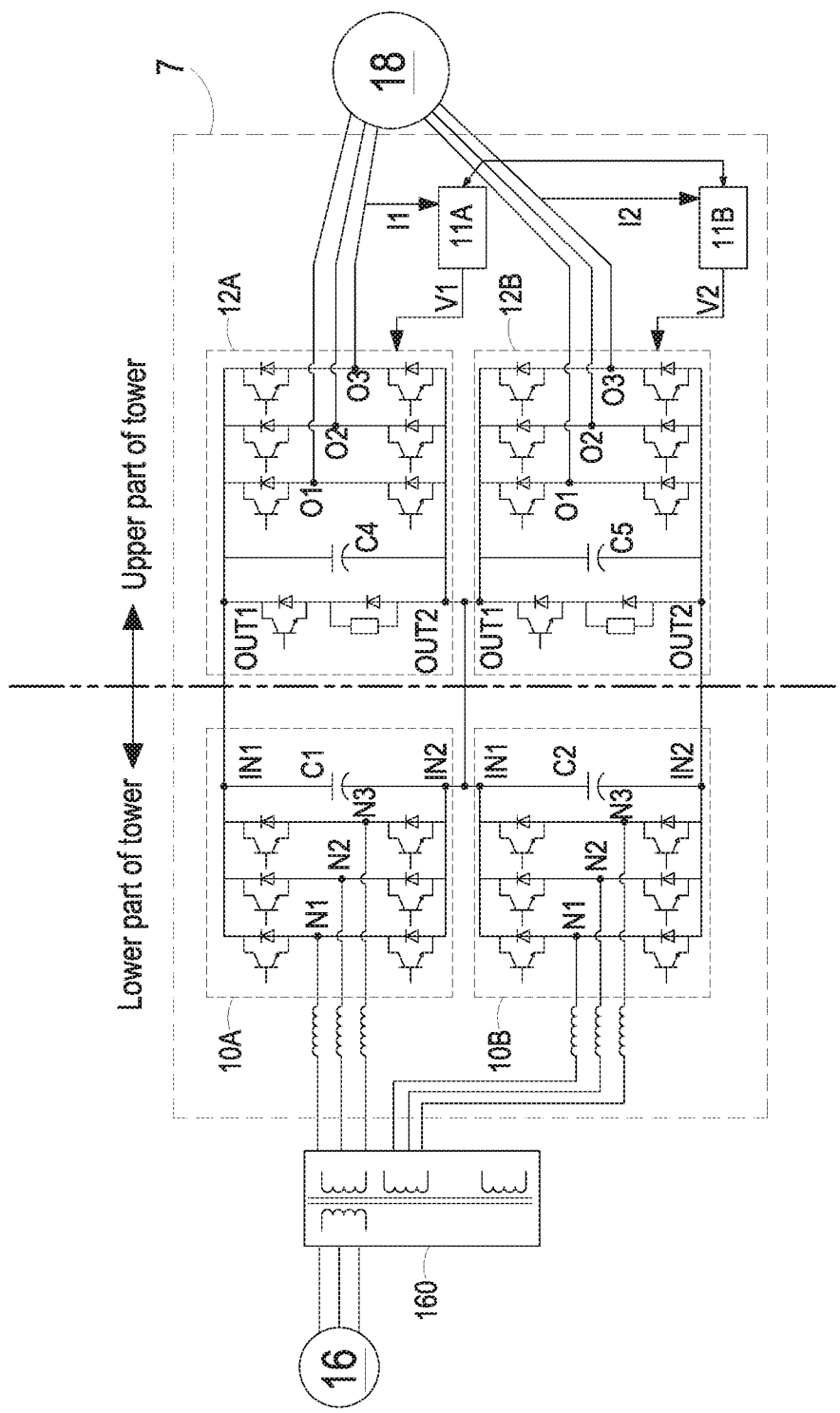
FIG. 8 is a circuit diagram of a wind power converting device according to a seventh embodiment of the present invention.

FIG. 8 is a circuit diagram of a wind power converting device according to a seventh embodiment of the present invention. The wind power converting device 7 includes a plurality of grid-side converters 10A~10B, a plurality of generator-side converters 12A~12B and a DC bus module. The plurality of grid-side converters 10A~10B are connected with each other in series. The plurality of generator-side converters 12A~12B are connected with each other in series. As for the seventh embodiment, the elements and features indicated by the numerals similar to those of the first embodiment of FIG. 1 mean similar elements and features, and are not redundantly described herein. In comparison with the wind power converting device 1 of FIG. 1, the wind power converting device 7 of this embodiment includes two grid-side converters 10A~10B and two generator-side converters 12A~12B.

It is noted that the number of the grid-side converters and the number of the generator-side converters are not limited to three as shown in FIG. 1 and are not limited to two as shown in FIG. 8. In some other embodiments, the wind power converting device includes more grid-side converters and more generator-side converters in order to achieve the efficient control purpose.

In some other embodiments, the grid-side converters and the generator-side converters of the wind power converting device are three-level converters. Similarly, the configurations of the three-level converters can be also applied to the wind power converting device as shown in FIG. 1.

Figure 9:
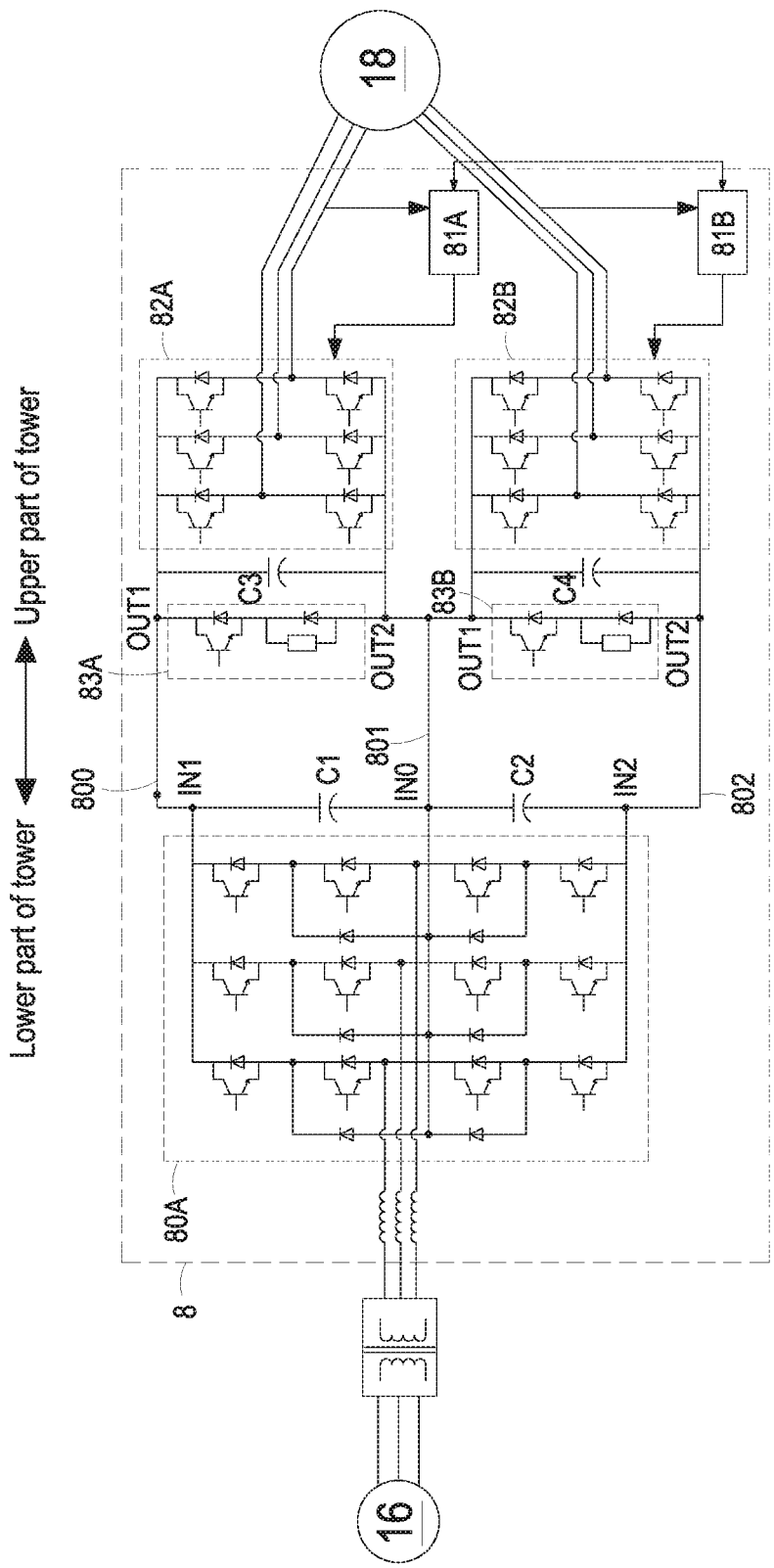
FIG. 9 is a circuit diagram of a wind power converting device according to an eighth embodiment of the present invention.

FIG. 9 is a circuit diagram of a wind power converting device according to an eighth embodiment of the present invention. The wind power converting device 8 includes a grid-side converter 80A, two generator-side converters 82A~82B and a DC bus module. The generator-side converters 82A~82B are connected with each other in series. The grid-side converter 80A is a three-level converter. The generator-side converters 82A~82B are two-level converters. The second DC output port OUT2 of the generator-side converter 82A is connected with the first DC output port OUT1 of the generator-side converter 82B in series.

The DC bus module includes three DC buses 800, 801 and 802. The DC bus 800 is electrically coupled to the first DC input port IN1 of the grid-side converter 80A and the first DC output port OUT1 of the generator-side converter 82A. The DC bus 800 is a positive DC bus for transferring the positive DC power. The DC bus 801 is electrically coupled to a first DC middle port IN0 of the grid-side converter 80A and the second DC output port OUT2 of the generator-side converter 82B. The DC bus 801 is an intermediate DC bus. The DC bus 802 is electrically coupled to the second DC input port IN2 of the grid-side converter 80A and the second DC output port OUT2 of the generator-side converter 82B. That is, the DC bus 802 is a negative DC bus for transferring the negative DC power.

The wind power converting device 8 further includes generator-side control modules 81A~81B. The generator-side control module 81A is used for controlling the generator-side converter 82A. The generator-side control module 81B is used for controlling the generator-side converter 82B. Each of the generator-side control modules 81A~81B has the control circuitry topology as shown in FIG. 7.

In an embodiment, the DC bus module further includes a plurality of bus capacitors C1~C4. The bus capacitor C1 is electrically connected between the first DC input port IN1 and the first DC middle port IN0 of the grid-side converter 80A. The bus capacitor C2 is electrically connected between the first DC middle port IN0 and the second DC input ports IN2 of the grid-side converter 80A. The bus capacitor C3 is electrically connected between the first DC output port OUT1 and the second DC output port OUT2 of the generator-side converter 82A. The bus capacitor C4 is electrically connected between the first DC output port OUT1 and the second DC output port OUT2 of the generator-side converter 82B. The bus capacitors are used for supporting the voltages of these input ports and these output ports.

In an embodiment, the wind power converting device 8 further includes chopper circuits 83A and 83B. The chopper circuit 83A is connected between the first DC output port OUT1 and the second DC output port OUT2 of the generator-side converter 82A in parallel. The chopper circuit 83B is connected between the first DC output port OUT1 and the second DC output port OUT2 of the generator-side converter 82B in parallel. The chopper circuits 83A and 83B perform the voltage-balancing protection on the generator-side converters 82A and 82B.

Similarly, the above asymmetric configuration can also be applied to the wind power converting device as shown in FIG. 1.

Figure 10:
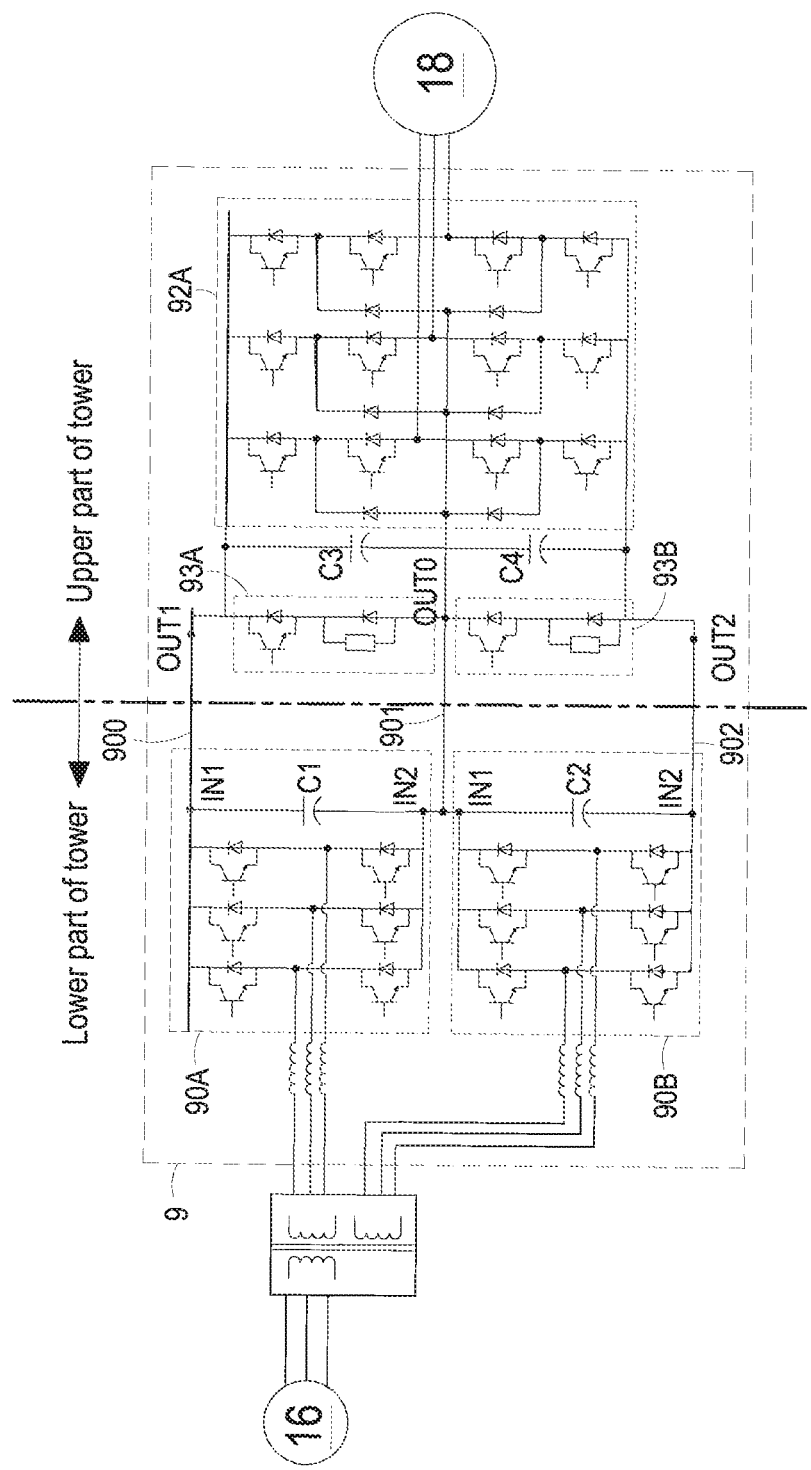
FIG. 10 is a circuit diagram of a wind power converting device according to a ninth embodiment of the present invention.

FIG. 10 is a circuit diagram of a wind power converting device according to a ninth embodiment of the present invention. The wind power converting device 9 includes two grid-side converters 90A~90B, a generator-side converter 92A and a DC bus module. The grid-side converters 90A~90B are connected with each other in series. The grid-side converters 90A~90B are two-level converters. The generator-side converter 92A is a three-level converter.

The DC bus module includes a plurality of DC buses 900, 901 and 902. The DC bus 900 is electrically coupled to the first DC input port IN1 of the grid-side converter 90A and the first DC output port OUT1 of the generator-side converter 92A. The DC bus 900 is a positive DC bus for transferring the positive DC power. The DC bus 901 is electrically coupled to the second DC input port IN2 of the grid-side converter 90A (or the first DC input port IN1 of the grid-side converter 90B) and a second DC middle port OUT0 of the generator-side converter 92A. The DC bus 901 is an intermediate DC bus. The DC bus 902 is electrically coupled to the second DC input port IN2 of the grid-side converter 90B and the second DC output port OUT2 of the generator-side converter 92A. That is, the DC bus 902 is a negative DC bus for transferring the negative DC power.

In an embodiment, the DC bus module further includes a plurality of bus capacitors C1~C4. The bus capacitor C1 is electrically connected between the first DC input port IN1 and the second DC input port IN2 of the grid-side converter 90A. The bus capacitor C2 is electrically connected between the first DC input port IN1 and the second DC input ports IN2 of the grid-side converter 90B. The bus capacitor C3 is electrically connected between the first DC output port OUT1 and the second DC middle port OUT0 of the generator-side converter 92A. The bus capacitor C4 is electrically connected between the second DC middle port OUT0 and the second DC output port OUT2 of the generator-side converter 92A. The bus capacitors are used for supporting the voltages of these input ports and these output ports.

In an embodiment, the wind power converting device 9 further includes chopper circuits 93A and 93B. The chopper circuit 93A is connected between the first DC output port OUT1 and the second DC middle port OUT0 of the generator-side converter 92A in parallel. The chopper circuit 93B is connected between the second DC middle port OUT0 and the second DC output port OUT2 of the generator-side converter 92B in parallel. The chopper circuits 93A and 93B perform the voltage-balancing protection on the generator-side converter 92A.

Similarly, the above asymmetric configuration can also be applied to the wind power converting device as shown in FIG. 1.

In an embodiment, the plurality of grid-side converters include n grid-side converters, the plurality of generator-side converters include 2n generator-side converters, and n is an integer greater than or equal to 1. The n grid-side converters further includes a first DC middle port. The DC bus module includes a positive DC bus, a negative DC bus and at least one intermediate DC bus between the positive DC bus and the negative DC bus. The positive DC bus is electrically coupled between the first DC input port of a first grid-side converter of the n grid-side converters and the first DC output port of a first generator-side converter of the 2n generator-side converters. The negative DC bus is electrically coupled between the second DC input port of an n-th grid-side converter of the n grid-side converters and the second DC output port of a 2n-th generator-side converter of the 2n generator-side converters. The at least one intermediate DC bus is electrically coupled between the first DC middle port of the n-th grid-side converter and the first DC input port of the 2n-th generator-side converter and between the second DC input port of an (n−1)-th grid-side converter of the n grid-side converters and the first DC output port of a (2n−1)-th generator-side converter of the 2n generator-side converters.

Figure 11:
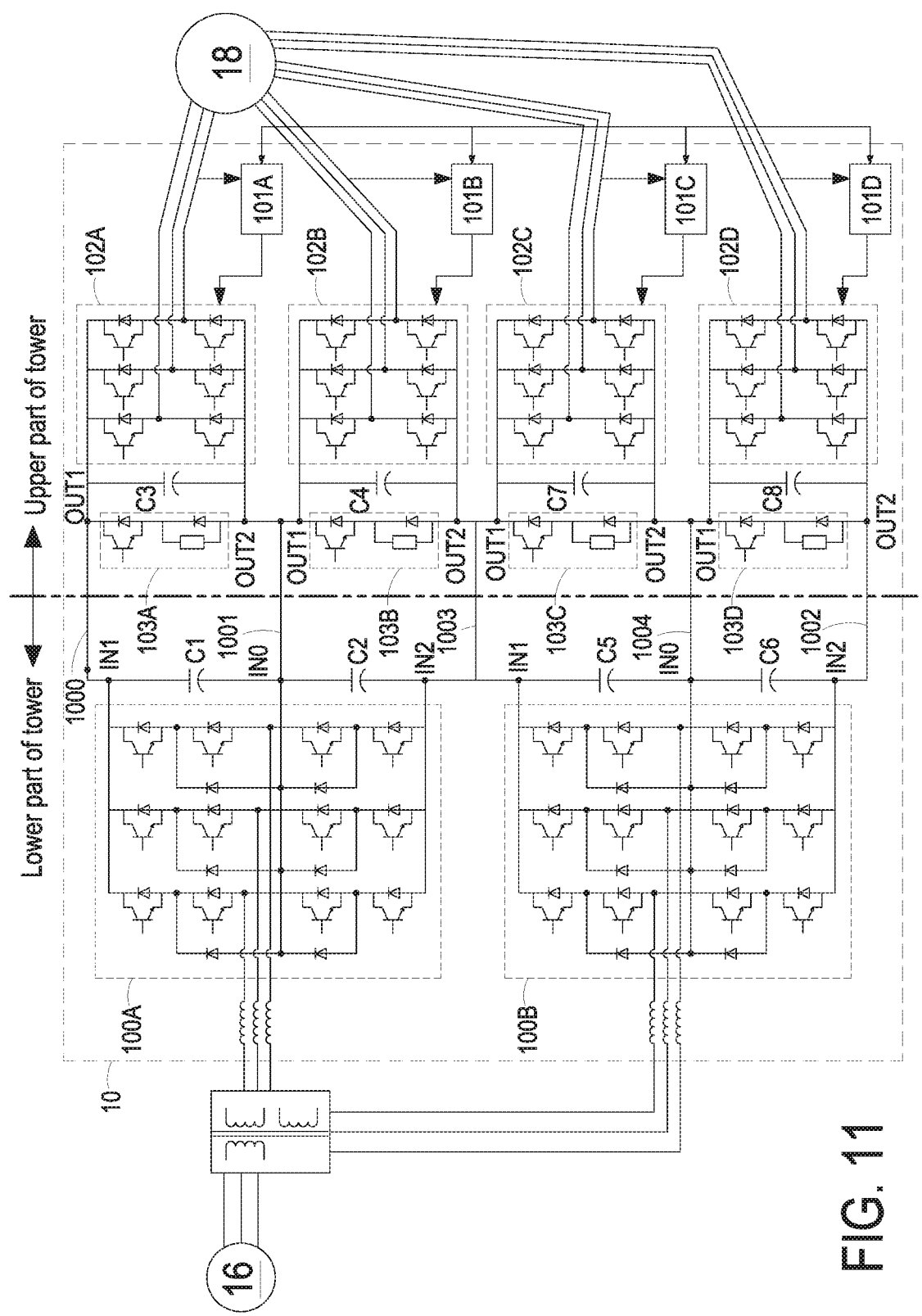
FIG. 11 is a circuit diagram of a wind power converting device according to a tenth embodiment of the present invention.

FIG. 11 is a circuit diagram of a wind power converting device according to a tenth embodiment of the present invention. The wind power converting device 10 includes a plurality of grid-side converters 100A~100B, a plurality of generator-side converters 102A~102D and a DC bus module.

The grid-side converters 100A~100B are three-level converters. The components in the grid-side converters 100A~100B are identical. The grid-side converters 100A~100B are electrically coupled to the power grid 16. The second DC input port IN2 of the grid-side converter 100A and the first DC input port IN1 of the grid-side converter 100B are connected with each other in series.

The components in the generator-side converters 102A~102D are identical. The generator-side converters 102A~102D are two-level converter. The generator-side converters 102A~102D are electrically coupled to a generator device 18. In the generator-side converters 102A~102D, the second DC output port OUT2 of one generator-side converter is connected with the first DC output port OUT1 of the adjacent generator-side converter in series. For example, the second DC output port OUT2 of the generator-side converter 102A is connected with the first DC output port OUT1 of the generator-side converter 102B in series. Similarly, the second DC output port OUT2 of the generator-side converter 102B is connected with the first DC output port OUT1 of the generator-side converter 102C in series. Similarly, the second DC output port OUT2 of the generator-side converter 102C is connected with the first DC output port OUT1 of the generator-side converter 102D in series.

The DC bus module includes a plurality of DC buses 1000, 1001, 1002, 1003 and 1004. The DC bus 1000 is electrically coupled to the first DC input port IN1 of the grid-side converter 100A and the first DC output port OUT1 of the generator-side converter 102A. The DC bus 1000 is a positive DC bus for transferring the positive DC power. The DC bus 1002 is electrically coupled to the second DC input port IN2 of the grid-side converter 100B and the second DC output port OUT2 of the generator-side converter 102D. The DC bus 1002 is a negative DC bus for transferring the negative DC power. The DC bus 1001 is electrically coupled to a first DC middle port IN0 of the grid-side converter 100A and the first DC output port OUT1 of the generator-side converter 102B. The DC bus 1003 is electrically coupled to the second DC input port IN2 of the grid-side converter 100A and the second DC output port OUT2 of the generator-side converter 102B. The DC bus 1004 is electrically coupled to a first DC middle port IN0 of the grid-side converter 100B the first DC output port OUT1 of the generator-side converter 102D. The DC buses 1001, 1003 and 1004 are intermediate DC buses.

The wind power converting device 10 further includes a plurality of generator-side control modules 101A~101D. The generator-side control module 101A is used for controlling the generator-side converter 102A. The generator-side control module 101B is used for controlling the generator-side converter 102B. The generator-side control module 101C is used for controlling the generator-side converter 102C. The generator-side control module 101D is used for controlling the generator-side converter 102D. Each of the generator-side control modules 101A~101D has the control circuitry topology as shown in FIG. 7.

In an embodiment, the DC bus module further includes a plurality of bus capacitors C1~C8. The bus capacitor C1 is electrically connected between the first DC input port IN1 and the first DC middle port IN0 of the grid-side converter 100A. The bus capacitor C2 is electrically connected between the first DC middle port IN0 and the second DC input ports IN2 of the grid-side converter 100A. The bus capacitor C3 is electrically connected between the first DC output port OUT1 and the second DC output port OUT2 of the generator-side converter 102A. The bus capacitor C4 is electrically connected between the first DC output port OUT1 and the second DC output port OUT2 of the generator-side converter 102B. The bus capacitor C5 is electrically connected between the first DC input port IN1 and the first DC middle port IN0 of the grid-side converter 100B. The bus capacitor C6 is electrically connected between the first DC middle port IN0 and the second DC input ports IN2 of the grid-side converter 100B. The bus capacitor C7 is electrically connected between the first DC output port OUT1 and the second DC output port OUT2 of the generator-side converter 102C. The bus capacitor C8 is electrically connected between the first DC output port OUT1 and the second DC output port OUT2 of the generator-side converter 102D. The bus capacitors are used for supporting the voltages of these input ports and these output ports.

In an embodiment, the wind power converting device 10 further includes a plurality of chopper circuits 103A~103D. For example, the wind power converting device 10 includes four chopper circuits 103A~103D. The chopper circuit 103A is connected between the first DC output port OUT1 and the second DC output port OUT2 of the generator-side converter 102A in parallel. The chopper circuit 103B is connected between the first DC output port OUT1 and the second DC output port OUT2 of the generator-side converter 102B in parallel. The chopper circuit 103C is connected between the first DC output port OUT1 and the second DC output port OUT2 of the generator-side converter 102C in parallel. The chopper circuit 103D is connected between the first DC output port OUT1 and the second DC output port OUT2 of the generator-side converter 102D in parallel. The chopper circuits 103A~103D perform the voltage-balancing protection on the generator-side converters 102A~102B.

In an embodiment, the plurality of grid-side converters include 2n grid-side converters, the plurality of generator-side converters include n generator-side converters, and n is an integer greater than or equal to 1. Each of the n generator-side converters further includes a second DC middle port. The DC bus module includes a positive DC bus, a negative DC bus and at least one intermediate DC bus between the positive DC bus and the negative DC bus. The positive DC bus is electrically coupled between the first DC input port of a first grid-side converter of the 2n grid-side converters and the first DC output port of a first generator-side converter of the n generator-side converters. The negative DC bus is electrically coupled between the second DC input port of a 2n-th grid-side converter of the 2n grid-side converters and the second DC output port of an n-th generator-side converter of the n generator-side converters. The at least one intermediate DC bus is electrically coupled between the first DC input port of the 2n-th grid-side converter and the second DC middle port of the n-th generator-side converter and between the second DC input port of an (2n−1)-th grid-side converter of the 2n grid-side converters and the second DC output port of the n-th generator-side converter of the 2n generator-side converters.

Figure 12:
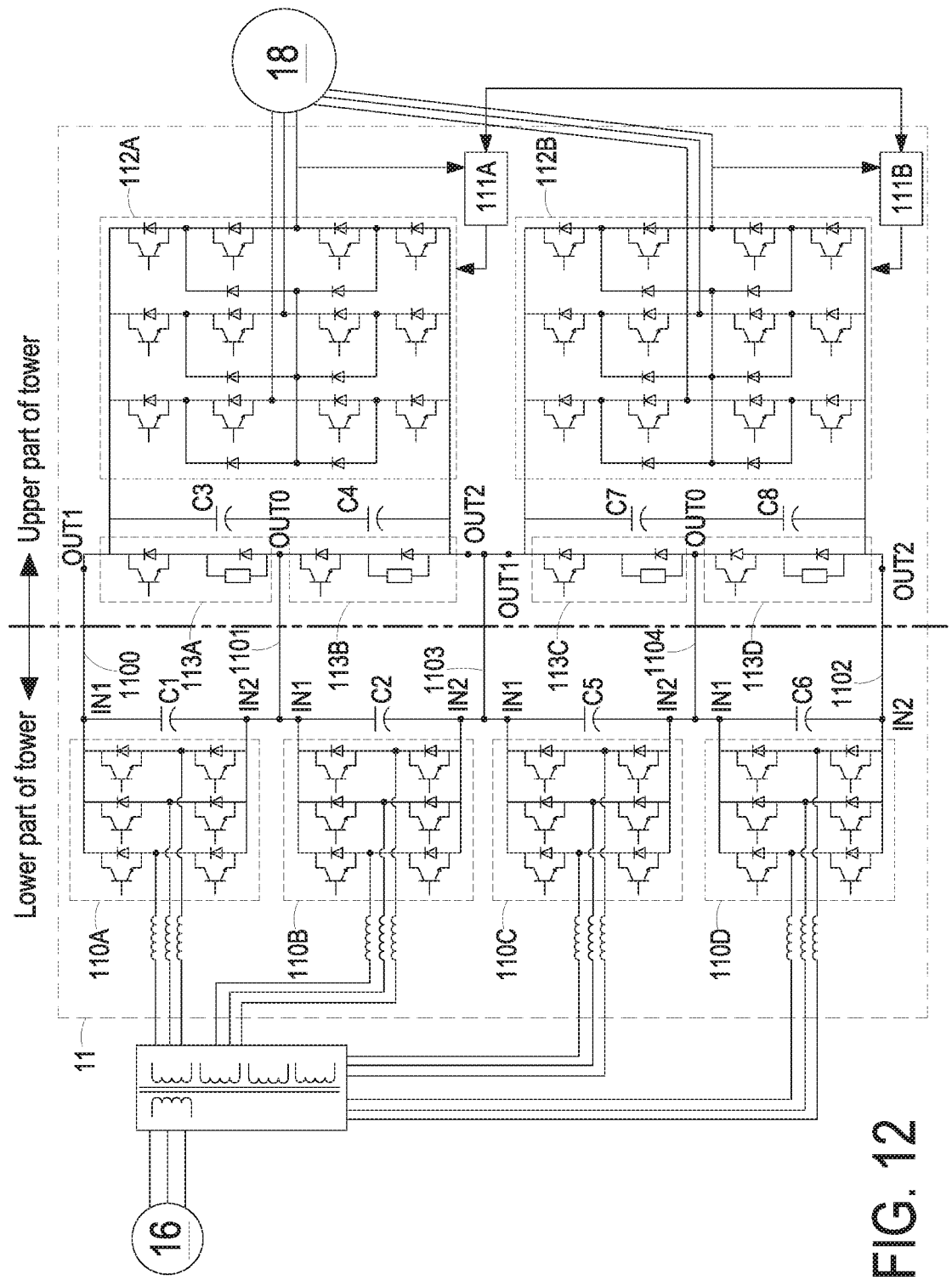
FIG. 12 is a circuit diagram of a wind power converting device according to an eleventh embodiment of the present invention.

FIG. 12 is a circuit diagram of a wind power converting device according to an eleventh embodiment of the present invention. The wind power converting device 11 includes a plurality of grid-side converters 110A~110D, a plurality of generator-side converters 112A~112B and a DC bus module.

In an embodiment, the components in the grid-side converters 110A~110D are identical. The grid-side converters 110A~110D are two-level converters. The grid-side converters 110A~110D are electrically coupled to the power grid 16. In the grid-side converters 110A~110D, the second DC input port IN2 of one grid-side converter is connected with the first DC input port IN1 of the adjacent grid-side converter in series. For example, the second DC input port IN2 of the grid-side converter 110A is connected with the first DC input port IN1 of the grid-side converter 110B in series. Similarly, the second DC input port IN2 of the grid-side converter 110B is connected with the first DC input port IN1 of the grid-side converter 110C in series. Similarly, the second DC input port IN2 of the grid-side converter 110C is connected with the first DC input port IN1 of the grid-side converter 110D in series.

In an embodiment, the components in the generator-side converters 112A~112B are identical. The generator-side converters 112A~112B are three-level converter. The generator-side converters 112A~112B are electrically coupled to a generator device 18. The second DC output port OUT2 of the generator-side converter 112A is connected with the first DC output port OUT1 of the generator-side converter 112B in series.

The DC bus module includes a plurality of DC buses 1100, 1101, 1102, 1103 and 1104. The DC bus 1100 is electrically coupled to the first DC input port IN1 of the grid-side converter 110A and the first DC output port OUT1 of the generator-side converter 112A. The DC bus 1100 is a positive DC bus for transferring the positive DC power. The DC bus 1102 is electrically coupled to the second DC input port IN2 of the grid-side converter 110D and the second DC output port OUT2 of the generator-side converter 112B. The DC bus 1102 is a negative DC bus for transferring the negative DC power. The DC bus 1101 is electrically coupled to the first DC input port IN1 of the grid-side converter 110B and a second DC middle port OUT0 of the generator-side converter 112A. The DC bus 1103 is electrically coupled to the second DC input port IN2 of the grid-side converter 110B and the second DC output port OUT2 of the generator-side converter 112A. The DC bus 1104 is electrically coupled to the first DC input port IN1 of the grid-side converter 110D and a second DC middle port OUT0 of the generator-side converter 112B. The DC buses 1101, 1103 and 1104 are intermediate DC buses.

The wind power converting device 11 further includes a plurality of generator-side control modules 111A~111B. The generator-side control module 111A is used for controlling the generator-side converter 112A. The generator-side control module 111B is used for controlling the generator-side converter 112B. Each of the generator-side control modules 111A~111B has the control circuitry topology as shown in FIG. 7.

In an embodiment, the wind power converting device 11 further includes a plurality of chopper circuits 113A~113D. The chopper circuit 113A is connected between the first DC output port OUT1 and the second DC middle port OUT0 of the generator-side converter 112A in parallel. The chopper circuit 113B is connected between the second DC middle port OUT0 and the second DC output port OUT2 of the generator-side converter 112A in parallel. The chopper circuit 113C is connected between the first DC output port OUT1 and the second DC middle port OUT0 of the generator-side converter 112B in parallel. The chopper circuit 113D is connected between the second DC middle port OUT0 and the second DC output port OUT2 of the generator-side converter 112B in parallel. The chopper circuits 113A~113D perform the voltage-balancing protection on the generator-side converters 112A and 112B.

In the above embodiments of FIGS. 8-12, the circuitry topology of the wind power converting device may be altered according to the practical requirement. Consequently, the flexibility of designing the wind power converting device is enhanced.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A wind power converting device, comprising:
one or a plurality of grid-side converters disposed in a lower part of a tower of a wind power generation system, wherein each the grid-side converter comprises a plurality of grid-side output ports electrically coupled to a power grid, a first DC input port and a second DC input port, wherein in every two adjacent grid-side converters of the plurality of grid-side converters, the second DC input port of one grid-side converter is connected with the first DC input port of the other grid-side converter in series;
one or a plurality of generator-side converters disposed in an upper part of the tower of the wind power generation system, wherein each the generator-side converter comprises a plurality of generator-side input ports electrically coupled to a generator device, a first DC output port and a second DC output port, wherein in every two adjacent generator-side converters of the plurality of generator-side converters, the second DC output port of one generator-side converter is connected with the first DC output port of the other generator-side converter in series; and
a DC bus module comprising a plurality of DC buses electrically coupled between the plurality of grid-side converters and the plurality of generator-side converters,
wherein the plurality of DC buses comprises a positive DC bus, a negative DC bus and at least one intermediate DC bus between the positive DC bus and the negative DC bus, wherein a cross section area of a conductor of the at least one intermediate DC bus is smaller than 30% of a cross section area of a conductor of the positive DC bus or smaller than 30% of a cross section area of a conductor of the negative DC bus.

2. The wind power converting device according to claim 1, wherein the plurality of grid-side converters comprise n grid-side converters, the plurality of generator-side converters comprise n generator-side converters, and n is an integer greater than or equal to 2, wherein the positive DC bus is electrically coupled between the first DC input port of a first grid-side converter of the n grid-side converters and the first DC output port of a first generator-side converter of the n generator-side converters, the negative DC bus is electrically coupled between the second DC input port of an n-th grid-side converter of the n grid-side converters and the second DC output port of an n-th generator-side converter of the n generator-side converters, and the intermediate DC bus is electrically coupled between the second DC input port of an (n−1)-th grid-side converter of the n grid-side converters and the second DC output port of an (n−1)-th generator-side converter of the n generator-side converters.

3. The wind power converting device according to claim 1, wherein the plurality of grid-side converters comprise n grid-side converters, the plurality of generator-side converters include 2n generator-side converters, and n is an integer greater than or equal to 1, wherein each of the n grid-side converters further comprises a first DC middle port, the positive DC bus is electrically coupled between the first DC input port of a first grid-side converter of the n grid-side converters and the first DC output port of a first generator-side converter of the 2n generator-side converters, the negative DC bus is electrically coupled between the second DC input port of an n-th grid-side converter of the n grid-side converters and the second DC output port of a 2n-th generator-side converter of the 2n generator-side converters, and the intermediate DC bus is electrically coupled between the first DC middle port of the n-th grid-side converter and the first DC input port of the 2n-th generator-side converter and between the second DC input port of an (n−1)-th grid-side converter of the n grid-side converters and the first DC output port of a (2n−1)-th generator-side converter of the 2n generator-side converters.

4. The wind power converting device according to claim 1, wherein the plurality of grid-side converters include 2n grid-side converters, the plurality of generator-side converters include n generator-side converters, and n is an integer greater than or equal to 1, wherein each of the n generator-side converters further comprises a second DC middle port, the positive DC bus is electrically coupled between the first DC input port of a first grid-side converter of the 2n grid-side converters and the first DC output port of a first generator-side converter of the n generator-side converters, the negative DC bus is electrically coupled between the second DC input port of a 2n-th grid-side converter of the 2n grid-side converters and the second DC output port of an n-th generator-side converter of the n generator-side converters, and the intermediate DC bus is electrically coupled between the first DC input port of the 2n-th grid-side converter and the second DC middle port of the n-th generator-side converter and between the second DC input port of an (2n−1)-th grid-side converter of the 2n grid-side converters and the second DC output port of the n-th generator-side converter of the 2n generator-side converters.

5. The wind power converting device according to claim 1, further comprising a plurality of generator-side control modules, wherein each of the plurality of generator-side control modules receive a three-phase input current amount from the plurality of generator-side input ports of the corresponding generator-side converter and a second-axis general given current component, and generates a three-phase voltage control signal to control operations of the corresponding generator-side converter according to the three-phase input current amount and the second-axis general given current component.

6. The wind power converting device according to claim 5, wherein each of the plurality of generator-side control modules comprises:

a current drawing unit for drawing the three-phase input current amount;

a first converting unit for converting the three-phase input current amount into a first-axis current component and a second-axis current component;

a first computing unit for performing computation to generate a first-axis difference according to the first-axis current component and a first-axis independent given current component;

a second computing unit for performing computation to generate a second-axis difference according to the second-axis current component and the second-axis general given current component;

a first current control unit for generating a first-axis voltage control signal according to the first-axis difference;

a second current control unit for generating a second-axis voltage control signal according to the second-axis difference; and a second converting unit for converting the first-axis voltage control signal and the second-axis voltage control signal into the three-phase voltage control signal.

7. The wind power converting device according to claim 1, wherein the DC bus module further comprises:

a plurality of first bus capacitors corresponding to the plurality of grid-side converters, wherein each of the plurality of first bus capacitors is electrically connected between the first DC input port and the second DC input port of the corresponding grid-side converter in parallel; and a plurality of second bus capacitors corresponding to the plurality of generator-side converters, wherein each of the plurality of second bus capacitors is electrically connected between the first DC output port and the second DC output port of the corresponding generator-side converter.

8. The wind power converting device according to claim 1, wherein the plurality of grid-side converters and the plurality of generator-side converters are two-level converters, or the plurality of grid-side converters and the plurality of generator-side converters are three-level converters.

9. The wind power converting device according to claim 8, further comprising a plurality of chopper circuits, wherein the plurality of chopper circuits are connected between the first DC output ports and the second DC output ports of the corresponding generator-side converters in parallel.

10. A wind power converting device, comprising:

a plurality of grid-side converters disposed in a lower part of a tower of a wind power generation system, wherein each of the plurality of grid-side converters comprises a plurality of grid-side output ports electrically coupled to a power grid, a first DC input port and a second DC input port, wherein in every two adjacent grid-side converters of the plurality of grid-side converters, the second DC input port of one grid-side converter is connected with the first DC input port of the other grid-side converter in series;

a plurality of generator-side converters disposed in an upper part of the tower of the wind power generation system, wherein each of the plurality of generator-side converters comprises a plurality of generator-side input ports electrically coupled to a generator device, a first DC output port and a second DC output port, wherein in every two adjacent generator-side converters of the plurality of generator-side converters, the second DC output port of one generator-side converter is connected with the first DC output port of the other generator-side converter in series; and a DC bus module comprising a plurality of DC buses electrically coupled between the plurality of grid-side converters and the plurality of generator-side converters; and at least one passive circuit protection component arranged in at least one power transmission path that is between the power grid and the generator device and established by the corresponding grid-side converter, the corresponding generator-side converter and the DC bus module, wherein electric energy is transferred through the power transmission path between the power grid and the generator device, wherein if a current flowing through the power transmission path corresponding to the passive circuit protection component exceeds a threshold current value of the passive circuit protection component, the passive circuit protection component is in an open state.

11. The wind power converting device according to claim 10, wherein the passive circuit protection component is a fuse.

12. The wind power converting device according to claim 10, wherein the passive circuit protection component is electrically connected with the corresponding DC bus, or electrically connected with a connection line between the corresponding grid-side output port of the corresponding grid-side converter and the power grid, or electrically connected with a connection line between the corresponding generator-side input port of the corresponding grid-side converter and the generator device.

13. A wind power converting device, comprising:

a plurality of grid-side converters disposed in a lower part of a tower of a wind power generation system, wherein each of the plurality of grid-side converters comprises a plurality of grid-side output ports electrically coupled to a power grid, a first DC input port and a second DC input port, wherein in every two adjacent grid-side converters of the plurality of grid-side converters, the second DC input port of one grid-side converter is connected with the first DC input port of the other grid-side converter in series;

a plurality of generator-side converters disposed in an upper part of the tower of the wind power generation system, wherein each of the plurality of generator-side converters comprises a plurality of generator-side input ports electrically coupled to a generator device, a first DC output port and a second DC output port, wherein in every two adjacent generator-side converters of the plurality of generator-side converters, the second DC output port of one generator-side converter is connected with the first DC output port of the other generator-side converter in series; and a DC bus module comprising a plurality of DC buses electrically coupled between the plurality of grid-side converters and the plurality of generator-side converters;

at least one active circuit protection component arranged in at least one power transmission path that is between the power grid and the generator device and established by the corresponding grid-side converter, the corresponding generator-side converter and the DC bus module, wherein electric energy is transferred through the power transmission path between the power grid and the generator device, at least one detection circuit arranged in the corresponding power transmission path, wherein if the detection circuit detects that the electric energy through the corresponding power transmission path is abnormal, the detection circuit issues an abnormal signal, wherein in response to the abnormal signal, the active circuit protection component in the corresponding power transmission path is switched to an open state.

14. The wind power converting device according to claim 13, wherein the active circuit protection component is a relay or a switch, and the detection circuit comprises a current sensor.

15. The wind power converting device according to claim 13, wherein the active circuit protection component is electrically connected with the corresponding DC bus, or electrically connected with a connection line between the corresponding grid-side output port of the corresponding grid-side converter and the power grid, or electrically connected with a connection line between the corresponding generator-side input port of the corresponding grid-side converter and the generator device.

16. The wind power converting device according to claim 15, wherein the detection circuit is electrically connected with the corresponding DC bus, or electrically connected with a connection line between the corresponding grid-side output port of the corresponding grid-side converter and the power grid, or electrically connected with a connection line between the corresponding generator-side input port of the corresponding grid-side converter and the generator device.

17. A wind power converting device, comprising:
a plurality of grid-side converters disposed in a lower part of a tower of a wind power generation system, wherein each of the plurality of grid-side converters comprises a plurality of grid-side output ports electrically coupled to a power grid, a first DC input port and a second DC input port, wherein in every two adjacent grid-side converters of the plurality of grid-side converters, the second DC input port of one grid-side converter is connected with the first DC input port of the other grid-side converter in series;
a plurality of generator-side converters disposed in an upper part of the tower of the wind power generation system, wherein each of the plurality of generator-side converters comprises a plurality of generator-side input ports electrically coupled to a generator device, a first DC output port and a second DC output port, wherein in every two adjacent generator-side converters of the plurality of generator-side converters, the second DC output port of one generator-side converter is connected with the first DC output port of the other generator-side converter in series; and
a DC bus module comprising a plurality of DC buses electrically coupled between the plurality of grid-side converters and the plurality of generator-side converters; and
a plurality of generator-side control modules in communication with each other for controlling operations of the corresponding generator-side converters, wherein if the generator-side converter corresponding to a specified generator-side control module of the plurality of generator-side control modules and/or the grid-side converter electrically coupled to the generator-side converter satisfies a predetermined protecting condition of the specified generator-side control module, the specified generator-side control module stops issuing a three-phase voltage control signal, so that the corresponding generator-side converter is disabled.

18. The wind power converting device according to claim 17, wherein if the specified generator-side control module stops issuing the three-phase voltage control signal, the other generator-side control modules are still enabled to drive the corresponding generator-side converters to support a function of the disabled generator-side converter.

19. The wind power converting device according to claim 17, wherein each of the plurality of generator-side control modules receive a three-phase input current amount from the plurality of generator-side input ports of the corresponding generator-side converter and a second-axis general given current component, and generates the three-phase voltage control signal to control the operations of the corresponding generator-side converter according to the three-phase input current amount and the second-axis general given current component.

20. The wind power converting device according to claim 19, wherein each of the plurality of generator-side control modules comprises:
a current drawing unit for drawing the three-phase input current amount;
a first converting unit for converting the three-phase input current amount into a first-axis current component and a second-axis current component;
a first computing unit for performing computation to generate a first-axis difference according to the first-axis current component and a first-axis independent given current component;
a second computing unit for performing computation to generate a second-axis difference according to the second-axis current component and the second-axis general given current component;
a first current control unit for generating a first-axis voltage control signal according to the first-axis difference;
a second current control unit for generating a second-axis voltage control signal according to the second-axis difference; and
a second converting unit for converting the first-axis voltage control signal and the second-axis voltage control signal into the three-phase voltage control signal.

21. The wind power converting device according to claim 19, wherein the generator-side control modules include a primary generator-side control module and at least one secondary generator-side control module, and the primary generator-side control module issues the second-axis general given current component to the at least one secondary generator-side control module.

* * * * *